US011899717B2

(12) United States Patent
Ruzic et al.

(10) Patent No.: US 11,899,717 B2
(45) Date of Patent: Feb. 13, 2024

(54) VIDEO PROCESSING METHOD, VIDEO PROCESSING APPARATUS, AND COMPUTER-READABLE STORAGE MEDIUM

(71) Applicant: BEIJING BYTEDANCE NETWORK TECHNOLOGY CO., LTD., Beijing (CN)

(72) Inventors: Erica Lynne Ruzic, Beijing (CN); Yi Duan, Beijing (CN)

(73) Assignee: BEIJING BYTEDANCE NETWORK TECHNOLOGY CO., LTD.

( * ) Notice: Subject to any disclaimer, the term of this patent is extended or adjusted under 35 U.S.C. 154(b) by 0 days.

(21) Appl. No.: 17/724,034

(22) Filed: Apr. 19, 2022

(65) Prior Publication Data

US 2023/0099444 A1    Mar. 30, 2023

(30) Foreign Application Priority Data

Sep. 27, 2021    (CN) .......................... 202111139005.9

(51) Int. Cl.
*G06F 16/783* (2019.01)
*G06F 16/732* (2019.01)
*G06F 16/78* (2019.01)
*G06V 20/40* (2022.01)

(52) U.S. Cl.
CPC ........ *G06F 16/784* (2019.01); *G06F 16/7335* (2019.01); *G06F 16/7867* (2019.01); *G06V 20/46* (2022.01)

(58) Field of Classification Search
CPC ............... G06F 16/784; G06F 16/7335; G06F 16/7867; G06V 20/46
See application file for complete search history.

(56) References Cited

U.S. PATENT DOCUMENTS

| | | | |
|---|---|---|---|
| 2013/0262588 A1 | 10/2013 | Barak et al. | |
| 2017/0310629 A1* | 10/2017 | Liu | H04L 51/52 |
| 2017/0330598 A1 | 11/2017 | Choi et al. | |
| 2018/0300046 A1* | 10/2018 | Goyal | G06F 16/5854 |
| 2019/0208264 A1* | 7/2019 | Delaney | G06F 16/435 |

FOREIGN PATENT DOCUMENTS

| | | |
|---|---|---|
| CN | 106851407 A | 6/2017 |
| CN | 111629252 A | 9/2020 |
| CN | 114253653 A | 3/2022 |

\* cited by examiner

*Primary Examiner* — Thai Q Tran
*Assistant Examiner* — Jose M Mesa

(57) ABSTRACT

This disclosure relates to a video processing method, a video processing apparatus, and a computer-readable storage medium. The video processing method includes: providing a first user with an interactive interface for tagging people in a video; receiving a tagging operation on at least one people in the video, which is inputted by the first user through the interactive interface; and in response to the tagging operation of the first user, displaying a tagging result in-feed outside a video display interface when the video is posted on a social network.

18 Claims, 20 Drawing Sheets

```
                          ┌─ S1
┌─────────────────────────────────────────────────────────┐
│ providing a first user with an interactive interface for│
│          tagging people in a video                      │
└─────────────────────────────────────────────────────────┘
                          │
                          ▼  ┌─ S3
┌─────────────────────────────────────────────────────────┐
│ receiving a tagging operation on at least one people in │
│ the video, which is inputted by the first user through  │
│          the interactive interface                      │
└─────────────────────────────────────────────────────────┘
                          │
                          ▼  ┌─ S5
┌─────────────────────────────────────────────────────────┐
│ in response to the tagging operation of the first user, │
│ displaying a tagging result in-feed outside a video     │
│ display interface when the video is posted on a         │
│          social network                                 │
└─────────────────────────────────────────────────────────┘
```

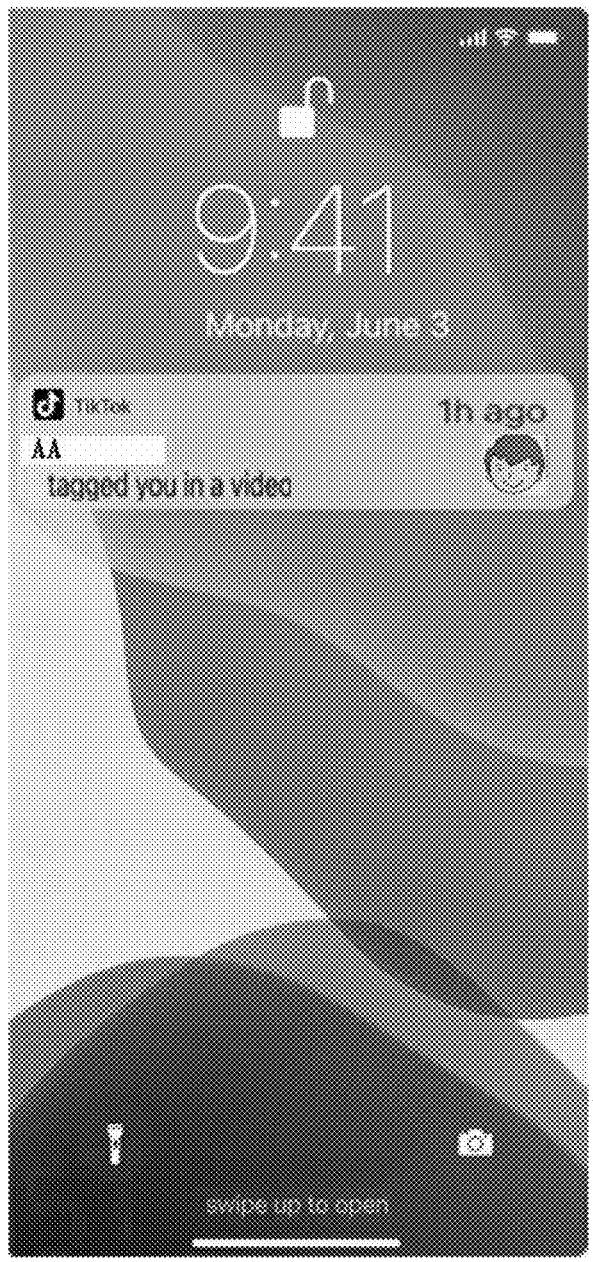
Fig. 5A                    Fig. 5B

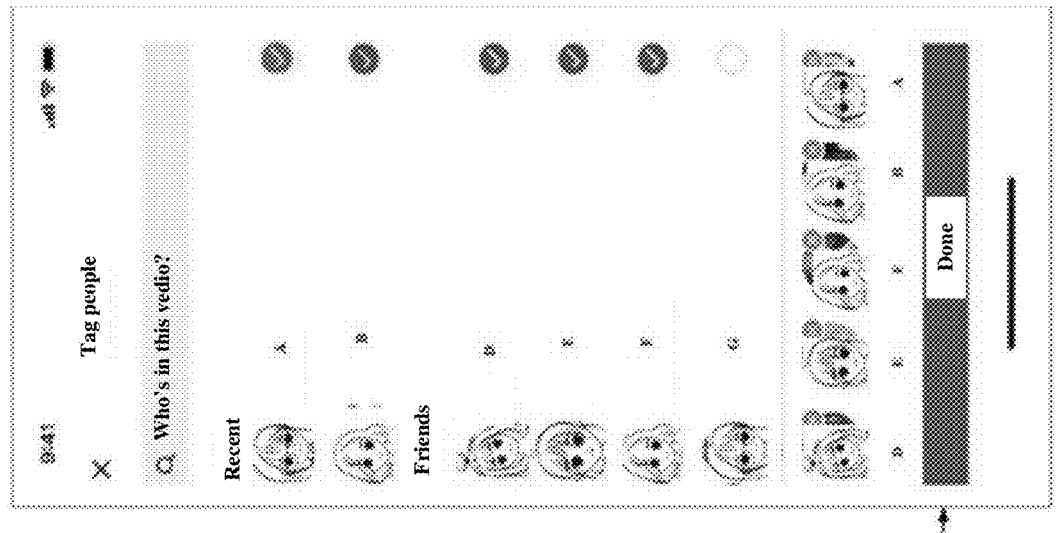
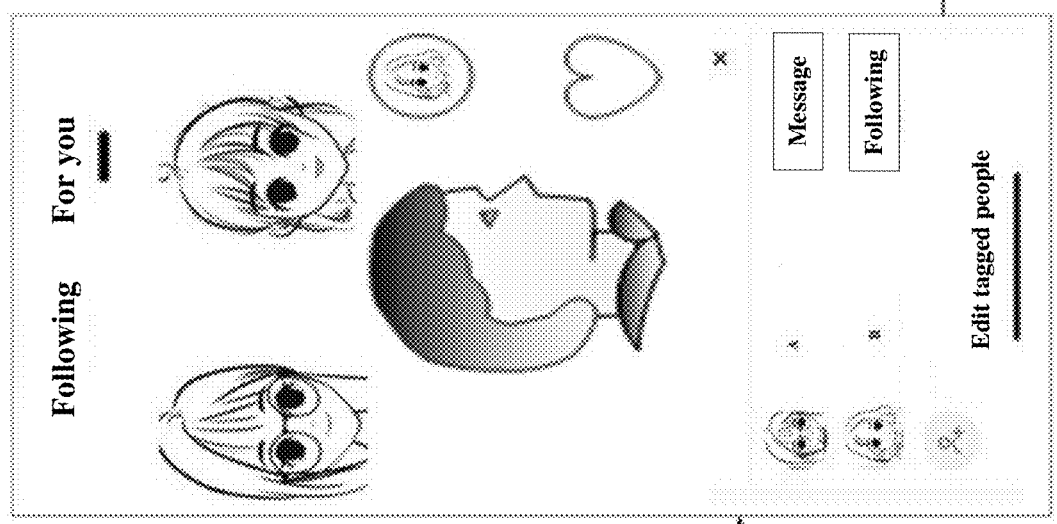
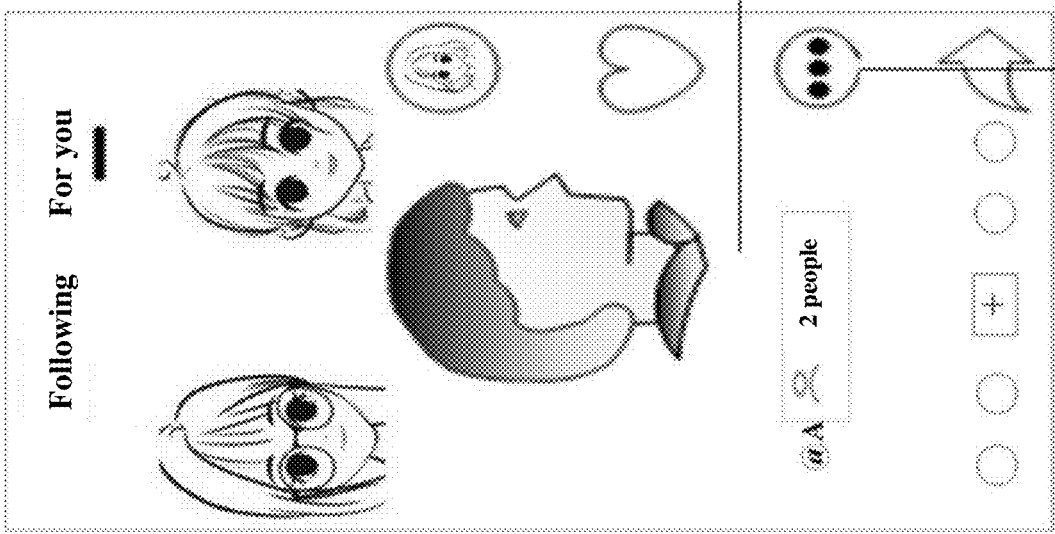
Fig. 6A
Fig. 6B
Fig. 6C

VIDEO PROCESSING METHOD, VIDEO PROCESSING APPARATUS, AND COMPUTER-READABLE STORAGE MEDIUM

CROSS-REFERENCE TO RELATED APPLICATIONS

This application claims priority to Chinese Patent Application No. 202111139005.9, entitled "VIDEO PROCESSING METHOD, VIDEO PROCESSING APPARATUS, AND COMPUTER-READABLE STORAGE MEDIUM", and filed on Sep. 27, 2021. The entire disclosure of the prior application is hereby incorporated by reference in its entirety.

TECHNICAL FIELD

This disclosure relates to the field of computer technologies, and in particular, to a video processing method, a video processing apparatus, and a computer-readable storage medium.

BACKGROUND

A social network can, according to an input of a user, provide various services, such as photo or video sharing, messaging, etc., to facilitate social interaction between users.

By using interaction with the social network, the user can upload digital media to a system for browsing by others. The digital media can include images, video, audio, text, and the like. For example, the user can post his own created video onto the social network, and initiate interactions with other users through an operation such as prompt and the like. The other users on the social network can interact with the video creator by browsing, liking, commenting, and the like.

With the user's increasing dependence on the social network, the user has higher and higher experience requirements for the social network.

SUMMARY

According to some embodiments of the present disclosure, there is provided a video processing method, comprising: providing a first user with an interactive interface for tagging people in a video; receiving a tagging operation on at least one people in the video, which is inputted by the first user through the interactive interface; and in response to the tagging operation of the first user, displaying a tagging result in-feed outside a video display interface when the video is posted on a social network.

According to other embodiments of the present disclosure, there is provided a video processing apparatus, comprising: a display configured to provide a first user with an interactive interface for tagging people in a video; a processor configured to receive a tagging operation on at least one people in the video, which is inputted by the first user through the interactive interface, wherein the display is further configured to display, in response to the tagging operation of the first user, a tagging result in-feed outside the video display interface when the video is posted on a social network.

According to still other embodiments of the present disclosure, there is provided a video processing apparatus, comprising: a memory; and a processor coupled to the memory, the processor being configured to perform, based on instructions stored in the memory, one or more steps in the video processing method according to any of the embodiments in the present disclosure.

According to further embodiments of the present disclosure, there is provided a computer-readable storage medium having thereon stored a computer program which, when executed by a processor, performs the video processing method according to any of the embodiments in the present disclosure.

The "SUMMARY" is provided to introduce, in a brief form, concepts that will be described in detail in the following "DETAILED DESCRIPTION". The "SUMMARY" is not intended to identify key features or essential features of the claimed technical solutions, nor is it intended to be used for limiting the scope of the claimed technical solutions.

Other features, aspects, and advantages of the present disclosure will become apparent from the following detailed description of exemplary embodiments thereof, which proceeds with reference to the accompanying drawings.

BRIEF DESCRIPTION OF THE DRAWINGS

Preferred embodiments of the present disclosure will be described below with reference to the accompanying drawings. The accompanying drawings described herein are used for providing further understanding of the present disclosure, and the accompanying drawings together with the following detailed description are incorporated in and form a part of this specification and serve to illustrate the present disclosure. It should be understood that the drawings in the following description relate only to some embodiments of the present disclosure and do not limit the present disclosure. In the drawings:

FIG. 5A illustrates a page on which a notification and push are sent to a user account of a tagged people after a video is posted according to some embodiments of the present disclosure;

FIG. 5B illustrates details of the notification and push in FIG. 5A;

FIG. 6A illustrates a display page when a video creator browses a posted video according to some embodiments of the present disclosure;

FIG. 6B illustrates a display page provided with an entry to "edit a tagged people" and having thereon displayed a tagged people in the video according to some embodiments of the present disclosure;

FIG. 6C illustrates an "edit a tagged people" page according to some embodiments of the present disclosure;

Figure 1:
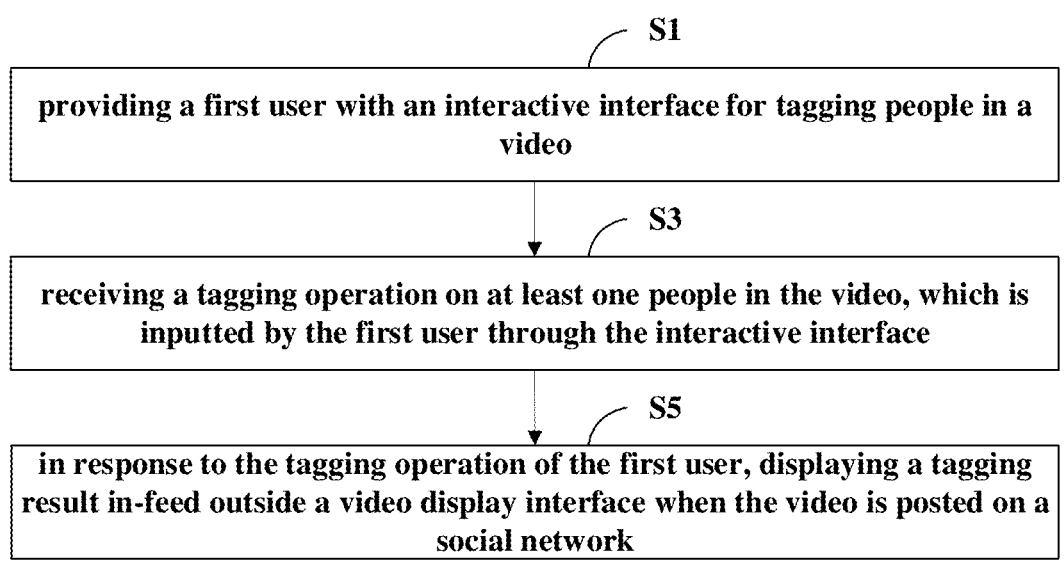
FIG. 1 illustrates a flow diagram of a video processing method according to some embodiments of the present disclosure.

It should be understood that sizes of various portions shown in the drawings are not necessarily drawn to an actual scale for ease of description. Identical or similar reference numbers are used in the drawings to refer to identical or similar components. Therefore, once a certain item is defined in one drawing, it may not be further discussed in a subsequent drawing.

DETAILED DESCRIPTION

The technical solutions in the embodiments of the present disclosure will be described clearly and completely in conjunction with the drawings in the embodiments of the present disclosure, but it is obvious that the embodiments described are only some of the embodiments of the present disclosure, not all of them. The following description of the embodiments is merely illustrative in nature and is in no way intended to limit this disclosure, its application, or uses. It should be understood that the present disclosure can be implemented in various forms and should not be construed as limited to the embodiments set forth herein.

It should be understood that the various steps recited in a method embodiment of the present disclosure can be performed in a different order, and/or performed in parallel. Moreover, the method embodiment can include additional steps and/or omit performing the illustrated steps. The scope of the present disclosure is not limited in this respect. Unless specifically stated otherwise, relative arrangements of components and steps, numerical expressions, and numerical values set forth in these embodiments should be construed as merely illustrative, without limiting the scope of the present disclosure.

A term "comprising" and variations thereof used in this disclosure are intended to be an open-minded term that includes at least subsequent elements/features, but do not exclude other elements/features, i.e., "comprising but not limited to". Furthermore, A term "including" and variations thereof used in this disclosure are intended to be an open-minded term that includes at least subsequent elements/features, but does not exclude other elements/features, i.e., "including but not limited to". Therefore, "comprising" is synonymous with "including". A term "based on" means "based at least in part on".

"One embodiment", "some embodiments", or "an embodiment" termed throughout this specification means that a specific feature, structure, or characteristic described in conjunction with an embodiment is included in at least one embodiment of the present invention. For example, the term "one embodiment" represents "at least one embodiment"; the term "another embodiment" represents "at least one additional embodiment"; the term "some embodiments" represents "at least some embodiments". Moreover, a phrase "in one embodiment", "in some embodiments", or "in an embodiment" appearing in various places throughout this specification do not necessarily all refer to a same one embodiment, but can also refer to the same one embodiment.

It should be noted that terms such as "first", "second", and the like mentioned in the present disclosure are only used for distinguishing different devices, modules or units, and are not used for limiting the order or interdependence of functions performed by these devices, modules or units. Unless otherwise specified, the terms "first", "second", and the like are not intended to imply that objects so described must be in a given order in time, space, ranking, or others.

It should be noted that the modifying of "one" or "more" mentioned in this disclosure is intended to be illustrative rather than limiting, and that those skilled in the art should appreciate that it should be understood as "one or more" unless otherwise expressly stated in the context.

Names of messages or information interacted between a plurality of devices in the embodiments of the present disclosure are for illustrative purposes only, and are not intended to limit the scope of the messages or information.

The embodiments of the present disclosure will be described in detail below in conjunction with the accompanying drawings, but the present disclosure is not limited to these specific embodiments. These specific embodiments can be combined with each other below, and a same or similar concept or process may not be repeated in some embodiments. Furthermore, in one or more embodiments, the specific features, structures, or characteristics can be combined in any suitable manner that would be apparent to one of ordinary skill in the art from this disclosure.

It should be understood that how an image or video to be applied/processed is obtained is also not limited in the present disclosure. In one embodiment of the present disclosure, the image or video can be acquired from a storage device, such as an internal memory or an external storage device, and in one other embodiment of the present disclosure, the image or video can be taken by a camera assembly. It should be noted that in the context of this specification, a type of the image or video is not specifically limited. Furthermore, the image or video can be an original image or video obtained by a camera device, or an image or video after the original image or video has been subjected to a specific process, such as preliminary filtering, antialiasing, color adjustment, contrast adjustment, normalization, and the like. It should be noted that a preprocessing operation can further include another type of preprocessing operation known in the art and will not be described in detail herein.

With the user's increasing dependence on the social network, the user has higher and higher experience requirements for the social network. To further enhance experience on the social network, people tagging function is introduced for a video on the social network. Once the tagging function is enabled, a creator will be able to tag people in the video and continue to edit a tagging result after the video is posted, for example, adding a tag, deleting a tag, changing a tag, etc.

FIG. 1 illustrates a flow diagram of a video processing method according to some embodiments of the present disclosure.

As shown in FIG. 1, the video processing method comprises: step S1, providing a first user with an interactive interface for tagging people in a video; step S3, receiving a tagging operation on at least one people in the video, which is inputted by the first user through the interactive interface; and step S5, in response to the tagging operation of the first user, displaying a tagging result in-feed outside a video display interface when the video is posted on a social network.

In the step S1, the first user is, for example, a video creator. The interactive interface is, for example, a video posting page.

Figure 2:
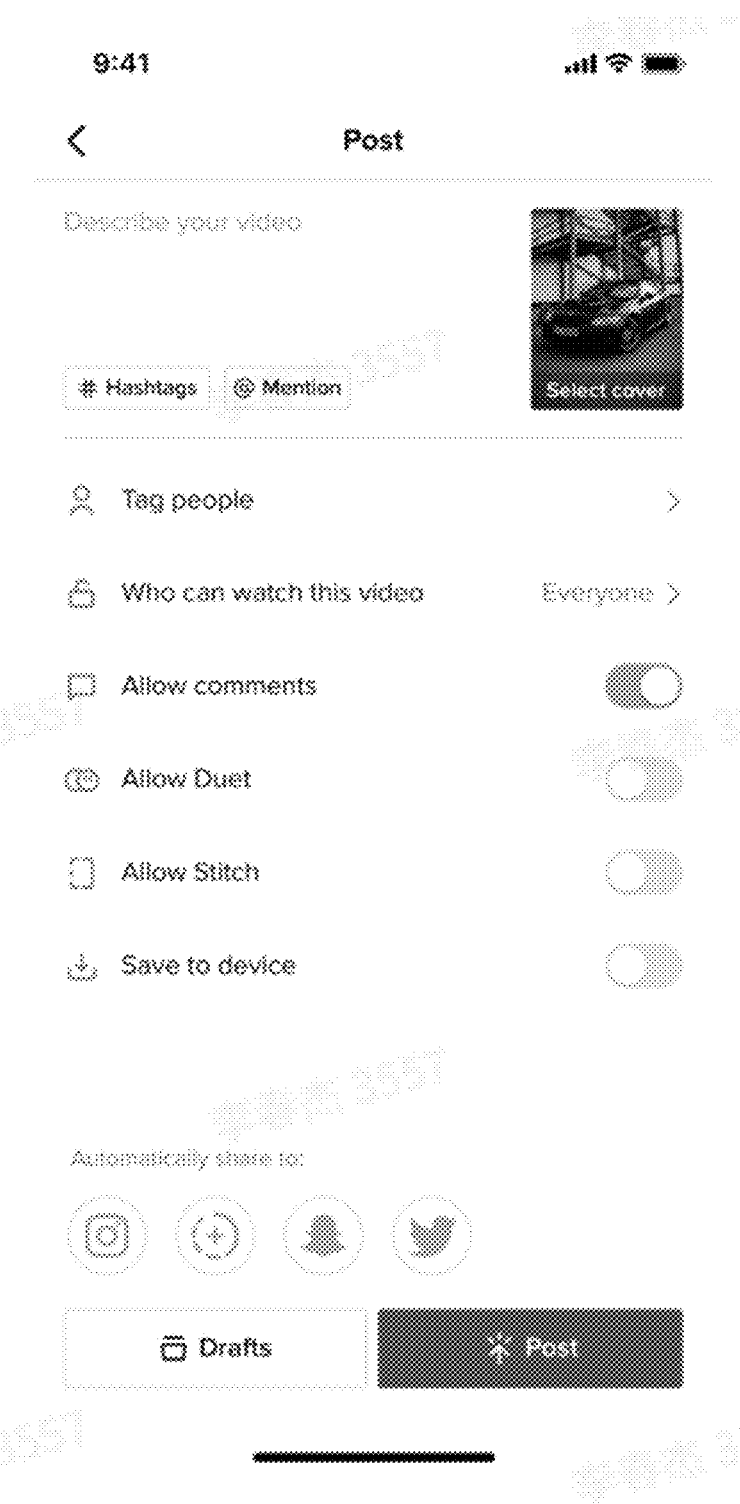
FIG. 2 illustrates a schematic diagram of an interactive interface according to some embodiments of the present disclosure.

FIG. 2 illustrates a schematic diagram of an interactive interface according to some embodiments of the present disclosure. As shown in FIG. 2, an entry to "tag people" is provided below a title of the video posting page, and after the entry is clicked, the "tag people" page is entered to perform a tagging operation. After the "tag people" page is entered, the first user can select a corresponding people to tag.

For a user unfamiliar with a tagging function, for example, for a user that uses the social network with the tagging function for the first time, a floating layer introducing the tagging function can also be provided. The floating layer introducing the tagging function can also be presented when a device enters a version of a social network with the tagging function for the first time.

Figure 2A:
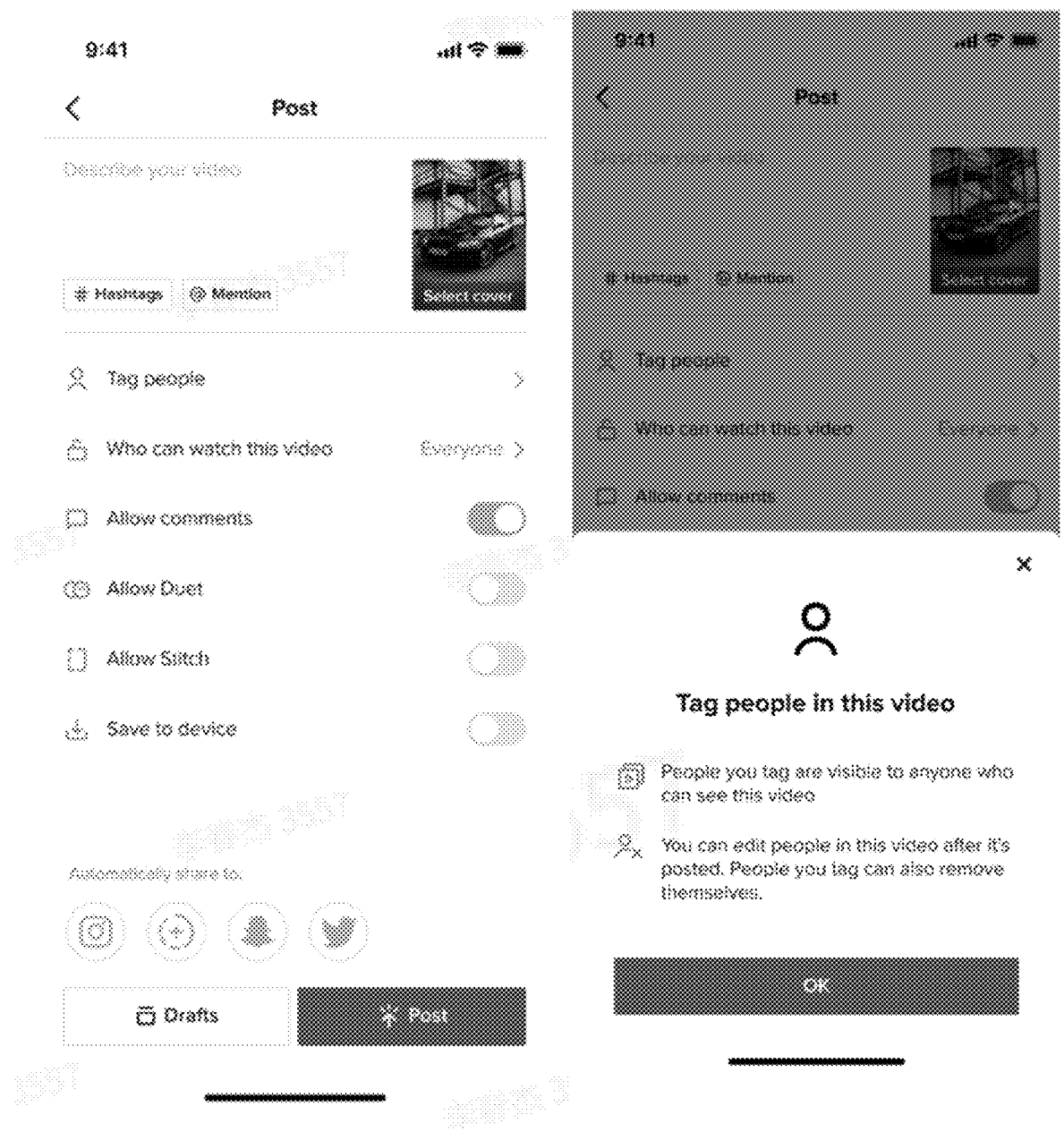
FIGS. 2A and 2B respectively illustrate interactive pages on which a tagging-introduction floating layer is presented in different ways according to some embodiments of the present disclosure.
Figure 2B:
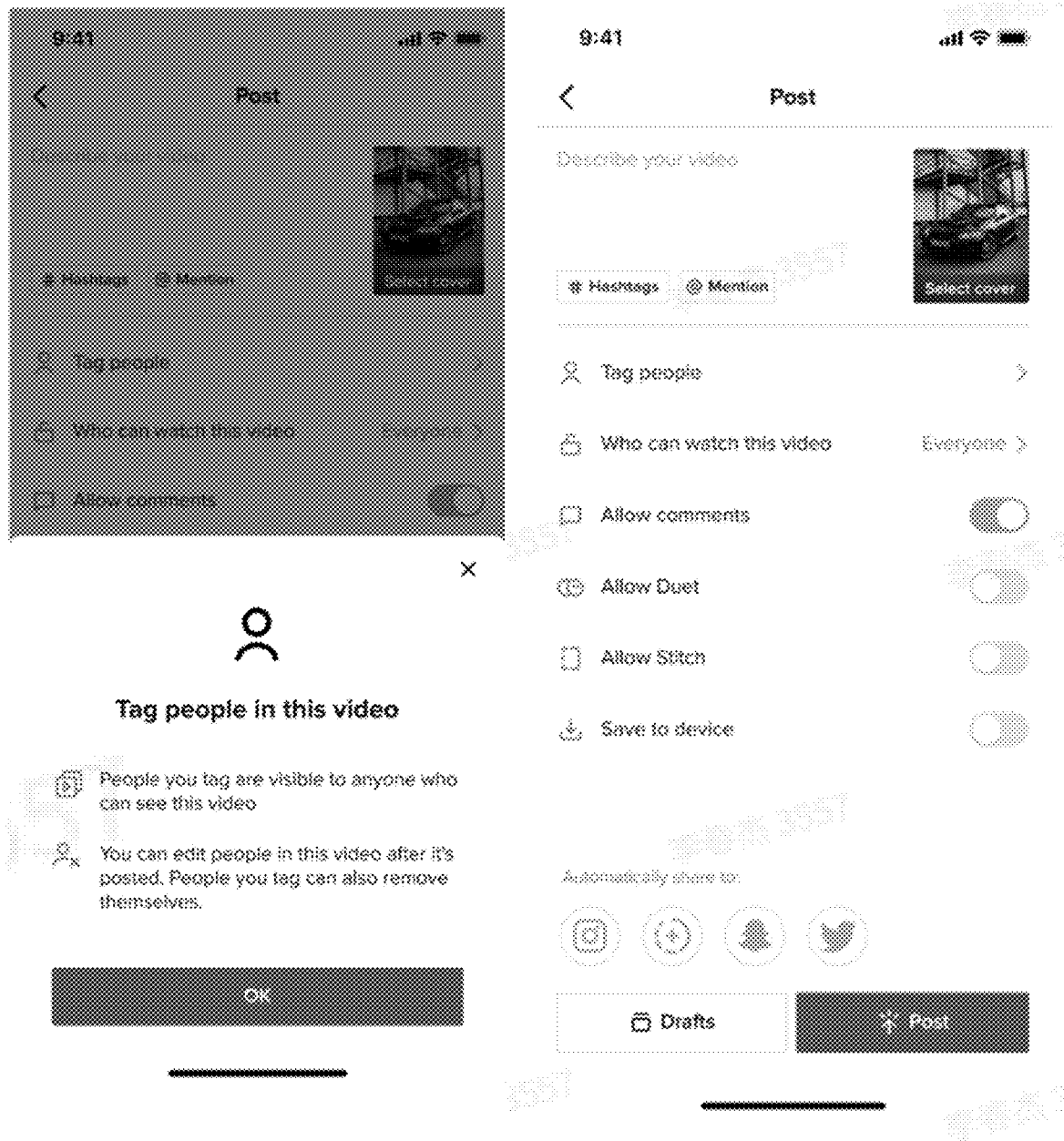

FIG. 2A and FIG. 2B respectively illustrate interactive pages on which the tagging-introduction floating layer is presented in different ways, but the tagging-introduction floating layer each comprises: a title "tag people in this video"; and statements "people tagged by you are visible to anyone capable of viewing this video" and "you can edit tagged people after the video is posted. The people tagged by you can also delete themselves."

The tagging-introduction floating layer can be closed by clicking on a confirmation button, "OK", a closing button, "x", and a top mask area in FIGS. 2A and 2B.

Figures 3A, 3B, 3C:
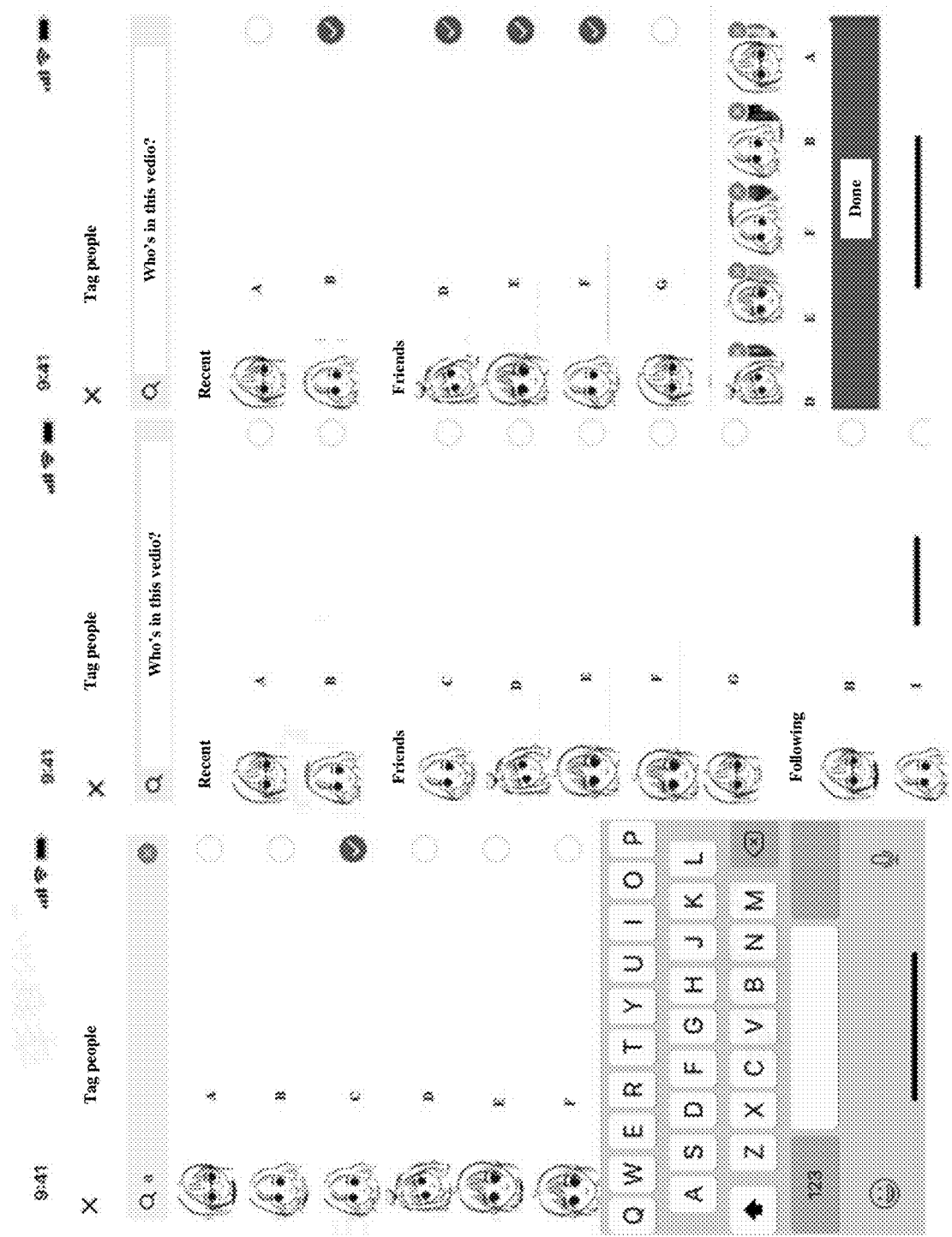
FIG. 3A illustrates a schematic diagram of a "tag people" page in a search state according to some embodiments of the present disclosure.
FIG. 3B illustrates a schematic diagram of a "tag people" page in a recommendation state according to some embodiments of the present disclosure.
FIG. 3C illustrates a schematic diagram of a "tag people" page on which a "tagged people" list is displayed according to some embodiments of the present disclosure.

FIG. 3A illustrates a schematic diagram of a "tag people" page in a search state according to some embodiments of the present disclosure. A search box on the page as shown in FIG. 3A can be used by the first user for searching for people to be tagged. Within a search range are all users, other than those blacklisted by the first user and those blacklisting the first user. A search result is presented in real time according to input text.

On the page are displayed an avatar, nickname and username of each user found. For example, as shown in FIG. 3A, if a letter "a" is entered in the search box, on the page are displayed all usernames with an initial "a" or "A", as well as a corresponding avatar and nickname of each user. In some embodiments, on the page is also displayed a relationship between each user and the first user, for example, friend and follow.

The first user can, after clicking on any user, process that user into a "selected" state and add him to a "tagged people" list. For example, as shown in FIG. 3A, the first user selects a user C as a tag of the people, that is, one certain people appearing in the video is tagged as "C".

In some embodiments, the first user can also select a corresponding people from a recommended tag list for tagging.

FIG. 3B illustrates a schematic diagram of a "tag people" page in a recommendation state according to some embodiments of the present disclosure. As shown in FIG. 3B, the recommended tag list can be divided into three areas: recently, friend and follow.

In some embodiments, the "recently" area can include 2 lists, namely a "people recently tagged" list and a "people recently sending a message" list, wherein the "people recently tagged" list is arranged before the "people recently sending a message" list, i.e., the "people recently tagged" list is presented first, and then the "people recently sending a message" list is presented. The two lists can be separately sorted according to last interaction time, and the number of all presented people can be set according to page presenting requirements, for example, 10 people are presented at most.

In the "friend" and "follow" lists are respectively listed people who is a friend with the first user and people who is followed by the first user, which can also be sorted according to initials. As shown in FIG. 3B, for each recommended user, his avatar, nickname, and username are presented.

The first user, after clicking on any user, processes that user into the "selected" state and adds him into the "tagged people" list. When there is a tagged people, a page shown in FIG. 3C appears.

FIG. 3C illustrates a schematic diagram of a "tag people" page on which a "tagged people" list is displayed according to some embodiments of the present disclosure. As shown in FIG. 3C, the "tagged people" list is in a lower area of the recommended tag list, which is presented only when there is a tagged people and can have thereon presented all tagged people in order of update time from morning till night.

In some embodiments, the first user can click on "x" in a top right corner of each tagged people to cancel his "selected" state. After clicking on a "finish (X)" button, the tagging state can be saved and the page is closed, where X is the number of tagged people.

Figures 3D, 3E:
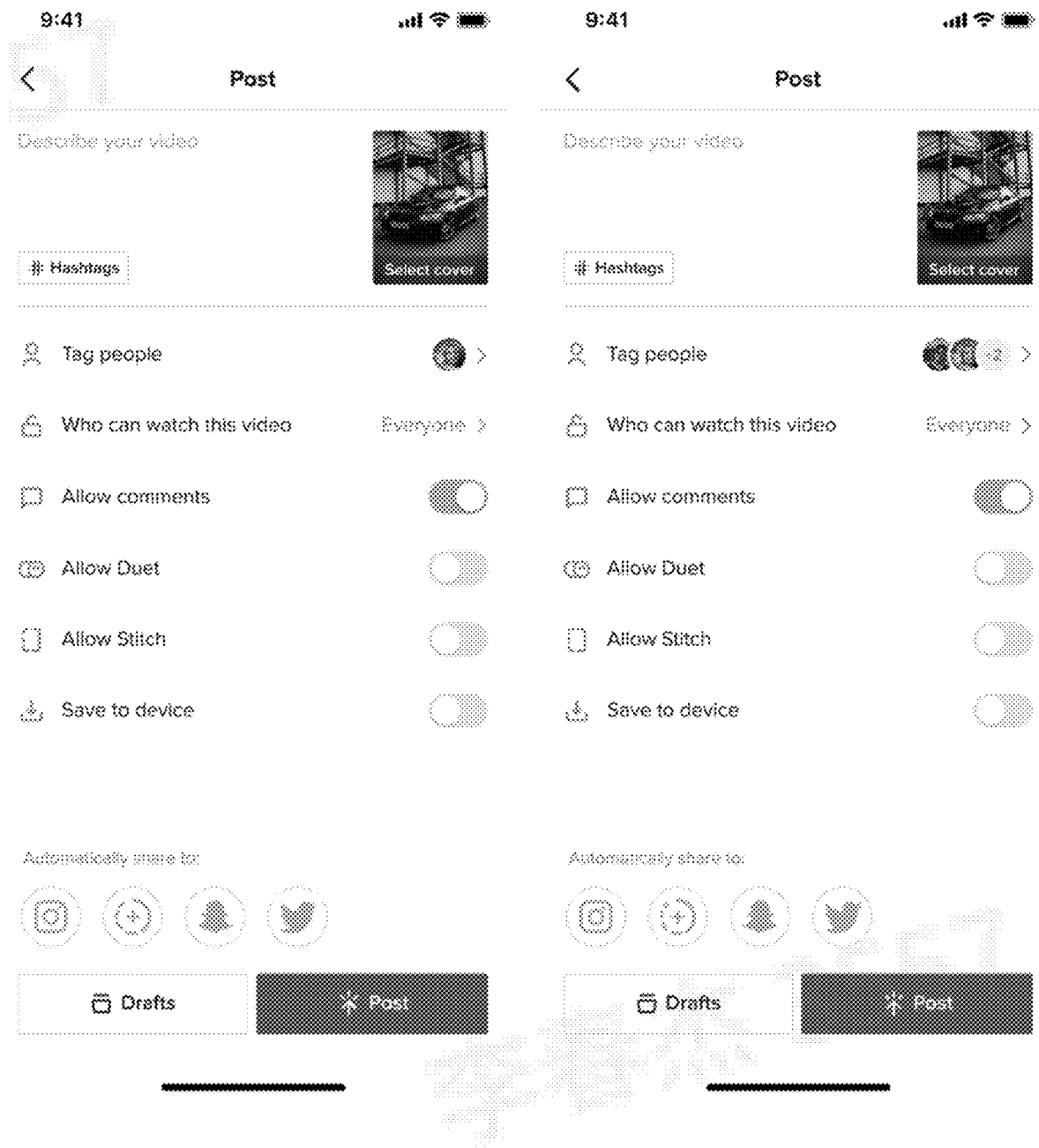
FIGS. 3D and 3E illustrate interactive interfaces before a video is posted in the case where a single people is tagged and in the case where multiple people are tagged, respectively, according to some embodiments of the present disclosure.

After the first user completes the tagging operation on the people in the video through the interactive interface, an interactive interface before the video is posted is shown in FIGS. 3D and 3E. FIGS. 3D and 3E illustrate the case where a single people is tagged and the case where multiple people are tagged, respectively.

As shown in FIG. 3D, an avatar of the tagged people is displayed beside the "tag people" button. In the case where the number of the tagged people is M, on the video posting page is displayed avatars of N tagged people and a difference X between the number of the tagged people and the number of displayed avatars, where M is a positive integer greater than 1, N is a positive integer greater than 1, M is greater than N, and X=M−N. As shown in FIG. 3E, M=4, avatars of 2 tagged people and "+2" are displayed beside the "tag people" button.

Figure 3F:
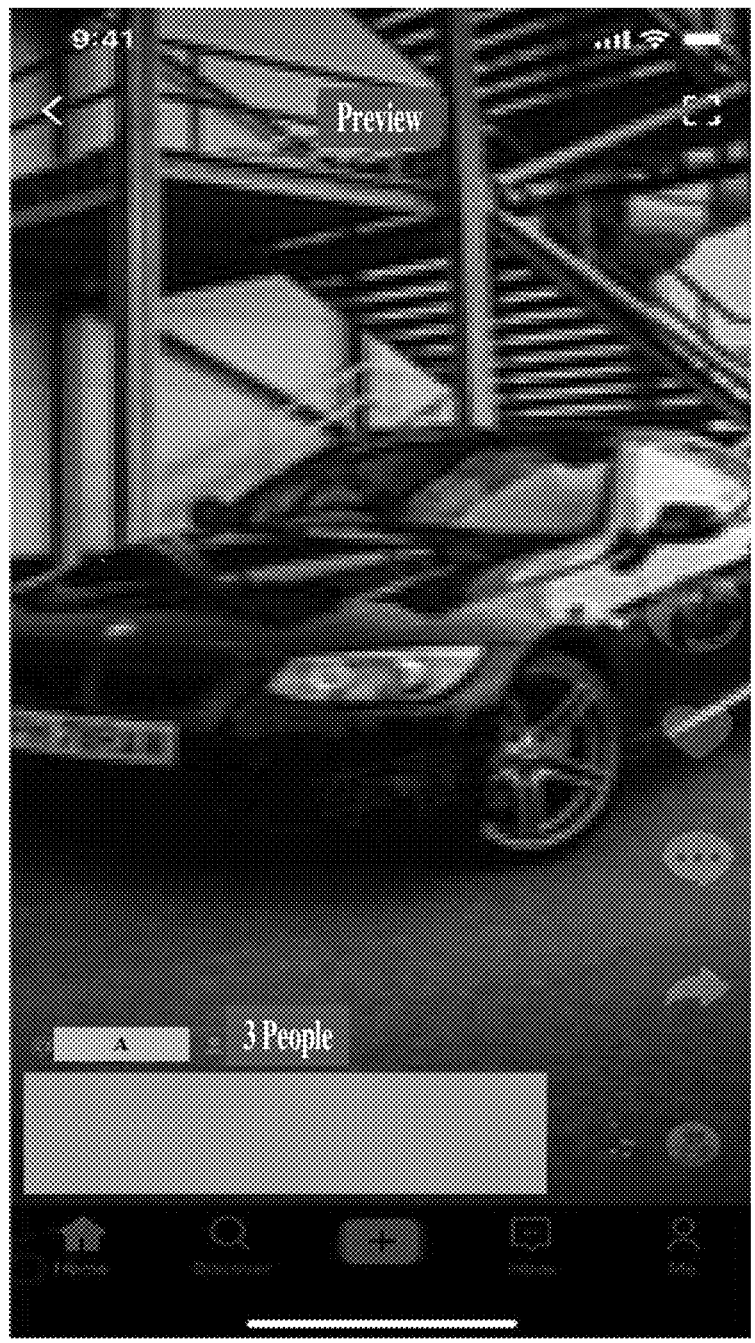
FIG. 3F illustrates a video preview page before a video is posted according to some embodiments of the present disclosure.

Before the video is posted, a video preview page of a cover can also be presented, as shown in FIG. 3F. Although there are no people in the cover, there are people in the video about to be posted, for example, after people have been tagged in the video, for example, 3 tagged people have been tagged, the tagging result is displayed on the video preview page, which provides an experience consistent with that of actually browsing a page of the video.

After the first user completes the tagging operation on the people in the video through the interactive interface, in response to the operation of posting the video by the first user, the tagging result is displayed in-feed outside the video display interface when the video is posted in the social network. The display page can include not only the tagging result of the video, but also other news feeds, and how to display these news feeds depends on an expected interest value of a browser. That is, the video can be displayed with a corresponding news feed according to the expected interest value of the browser for the video.

In some embodiments, the expected interest value of the browser for the video can be determined according to browser's relationships with the first user and the tagged people in the video. Different news feed display manners can be selected according to the expected interest value.

For example, in the case where the expected interest value of the browser for the video is greater than or equal to a threshold, an avatar of at least one tagged people in the video is displayed; and in the case where the expected interest value of the browser for the video is less than the threshold, a username of the at least one tagged people in the video is displayed.

In addition, a label of the video displayed to the browser can be determined according to the browser's relationships with the first user and the tagged people in the video.

In some embodiments, in the case where the browser is one of the tagged people in the video, the label is determined as a first label, i.e., the video can be displayed with the first label; in the case where the browser is not one of the tagged people in the video but is in association with the first user and a tagged people in the video, the label is determined as a second label, i.e., the video is displayed with the second label; in the case where the browser is not one of the tagged people in the video, is not in association with the first user, but is in association with the tagged people in the video, the label is determined as a third label, i.e., the video is displayed with the third label; and in the case where the browser is not one of the tagged people in the video and is not in association with the first user and the tagged people in the video, the label is determined as a fourth label, i.e., the video is displayed with the fourth label.

The first label is, for example, "you are tagged in the video". The second label is, for example, "friend/your following". The third label is, for example, "friend/following is tagged". The fourth label is, for example, "no association", or "low interest value", or "none". The association includes friend or follow. In the case where the fourth label is "none", there is no special label when the video is displayed.

In the case of the first label, the second label, and the third label, i.e., the expected browser has a high interest value for the video, the avatar of the at least one tagged people in the video can be displayed. In the case of the fourth label, i.e., the expected browser has a low interest value for the video, the username of the at least one tagged people in the video can be displayed. Regardless of whether the expected interest value is high or low, there can be different display pages according to the number of the tagged people in the video.

It should be appreciated that the video is displayed to the browser with the first label, the second label, or the third label because the expected browser has a high interest value for the video; and the video is displayed to the browser with the fourth label because the expected browser is uninterested in the video, i.e., having a low interest value, that is, the browser has no relationship with the video creator, and anyone in the video, such as friend/follow/matching friend, etc. When the video creator and the browser are matching friends and the video creator is displayed in a form of card, the label item will be displayed as a low interest value in a new row.

Figure 4A:
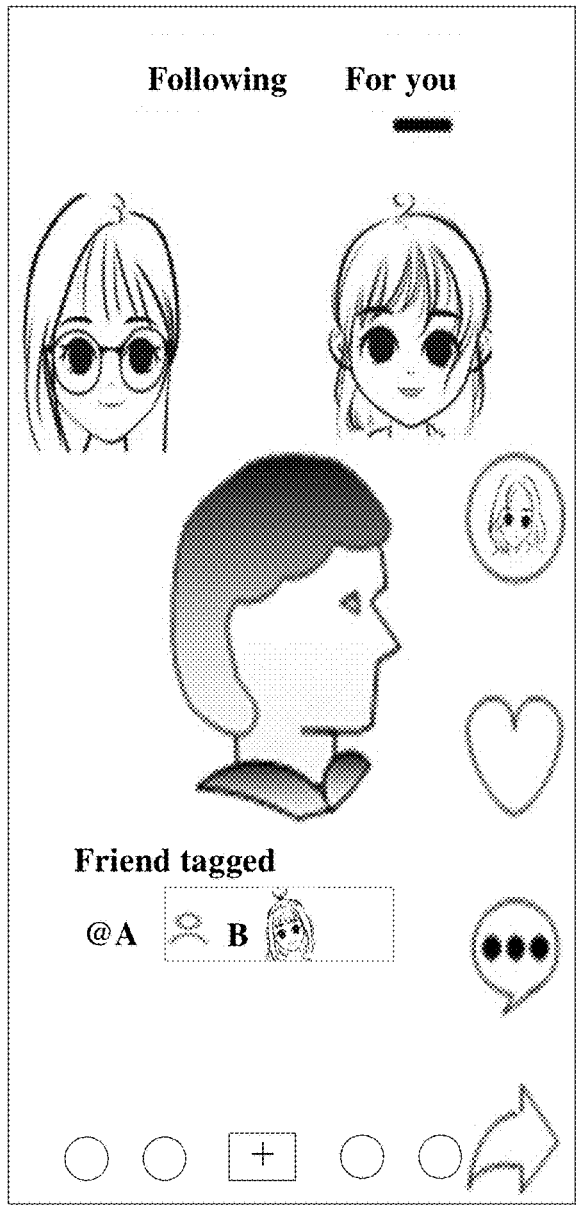
FIGS. 4A and 4B respectively illustrate schematic diagrams of high-interest-value display pages according to some embodiments of the present disclosure.
Figure 4B:
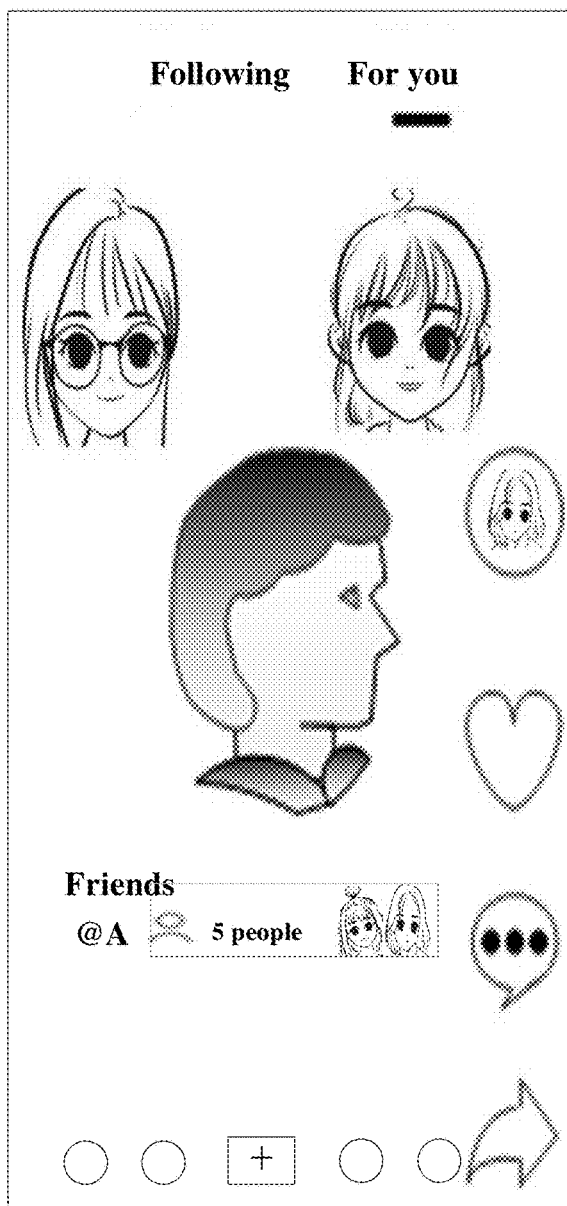

FIG. 4A and FIG. 4B respectively illustrate schematic diagrams of high-interest-value display pages according to some embodiments of the present disclosure.

FIG. 4A illustrates the case where only 1 people is tagged. As shown in FIG. 4A, only 1 people is tagged, and an avatar and username of the tagged people are displayed. If the username of the tagged people is too long, tagged items and creation time (if any) can be displayed in a new row. In this case, if the username of the tagged user is still too long, the display of the avatar is retained and the username is processed by using a symbol "***".

FIG. 4A also illustrates a label (third label) of "friend is tagged". When the display page is clicked, a tag list floating layer is opened.

FIG. 4B illustrates the case where multiple people are tagged. As shown in FIG. 4B, since multiple people are tagged and display of all avatars and usernames will occupy the display page excessively, only avatars of part (for example, 2 people) of the tagged people are displayed, but the number of the tagged people is displayed, for example, "5 people" are tagged, and the usernames of the tagged people are no longer displayed. FIG. 4B also illustrates a label (second label) of "friend".

Figure 4C:
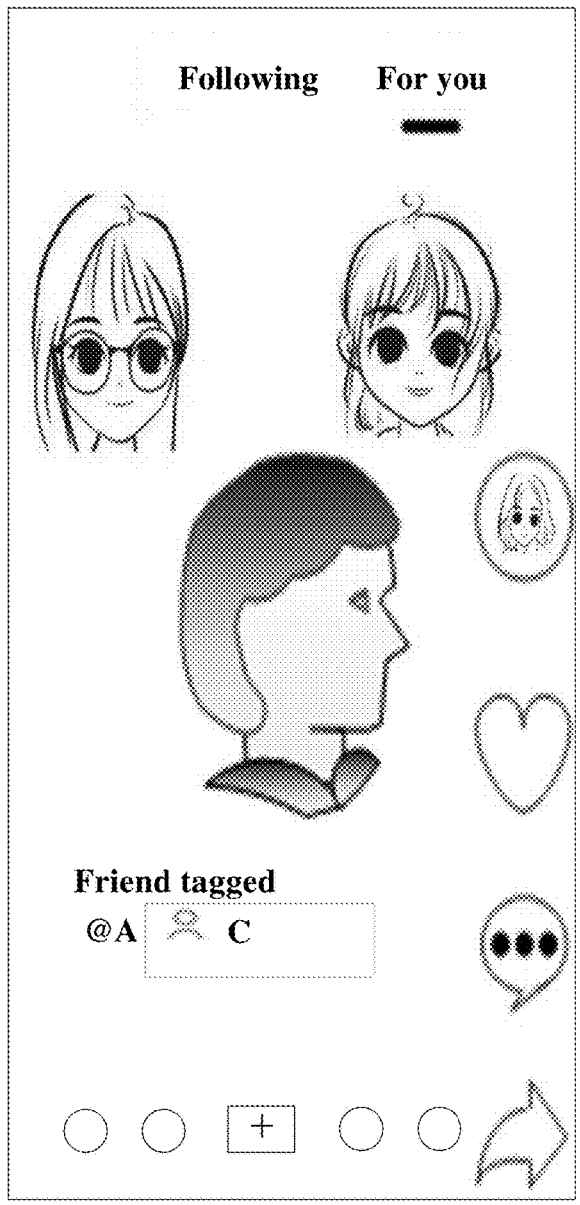
FIGS. 4C and 4D respectively illustrate schematic diagrams of low-interest-value display pages according to some embodiments of the present disclosure.
Figure 4D:
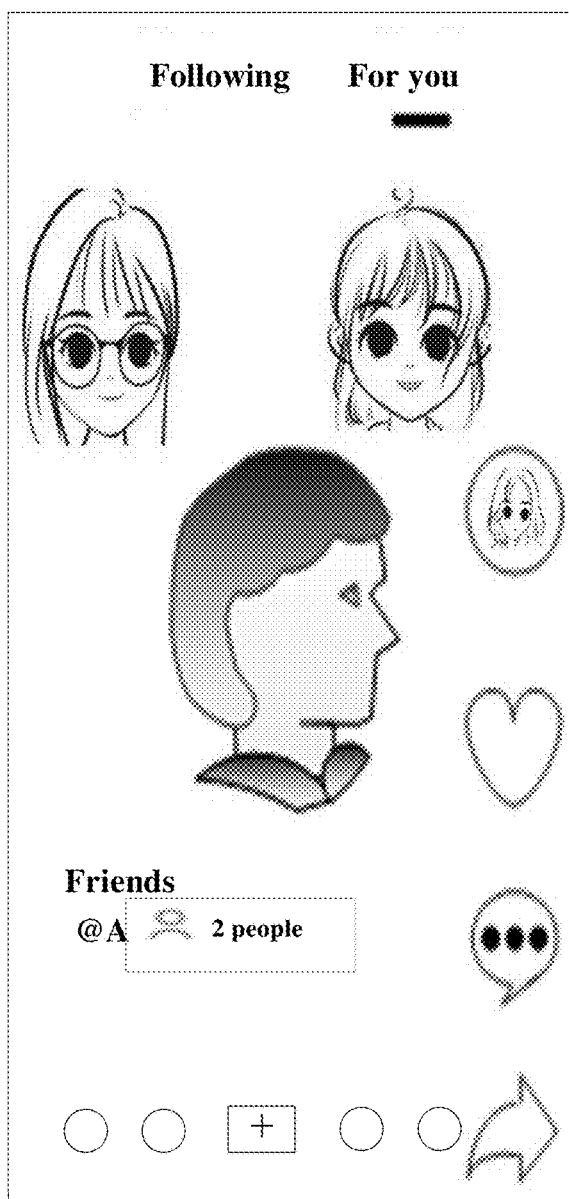

FIG. 4C and FIG. 4D respectively illustrate schematic diagrams of low-interest-value display pages according to some embodiments of the present disclosure.

FIG. 4C illustrates the case where only 1 people is tagged. As shown in FIG. 4C, only 1 people is tagged, and a username of the tagged people is displayed. In FIG. 4C, there is no label corresponding to a relationship, i.e., the fourth label is none.

FIG. 4D illustrates the case where multiple people are tagged. As shown in FIG. 4D, since multiple people are tagged and display of all usernames will occupy the display page excessively, the display is only that multiple people are tagged, for example, "2 people" are tagged. In FIG. 4D, there is also no label corresponding to a relationship, i.e., the fourth label is also none.

The expected interest value of the browser for the video is not fixed, but may vary with browser's behaviors or other features, other than depending on the browser's relationships with the first user and the tagged people in the video.

In some embodiments, the expected interest value of the browser for the video, which is determined according to the relationships, can be adjusted according to duration of browsing the video by the browser. For example, when it is monitored that stay time of viewing the video by the browser having the expected low interest value exceeds a threshold, for example, the user views the video for 5 seconds, the expected low interest value can be adjusted to a high interest value, thereby adjusting the display page.

In other embodiments, the expected interest value of the browser for the video can also be adjusted according to other features associated with the browsing of the video, thereby changing the display page from the low-interest-value display to the high-interest-value display.

Figure 4E:
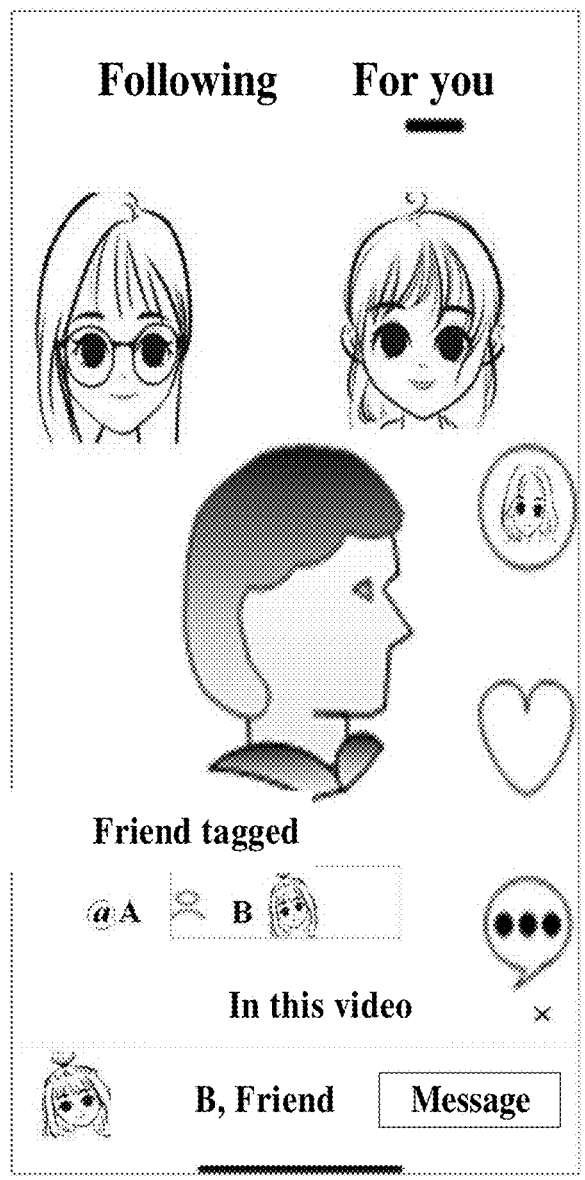
FIGS. 4E and 4F illustrate displaying a floating layer with a tagged-people list in the case where a single people is tagged and in the case where multiple people are tagged, respectively, according to some embodiments of the present disclosure.
Figure 4F:
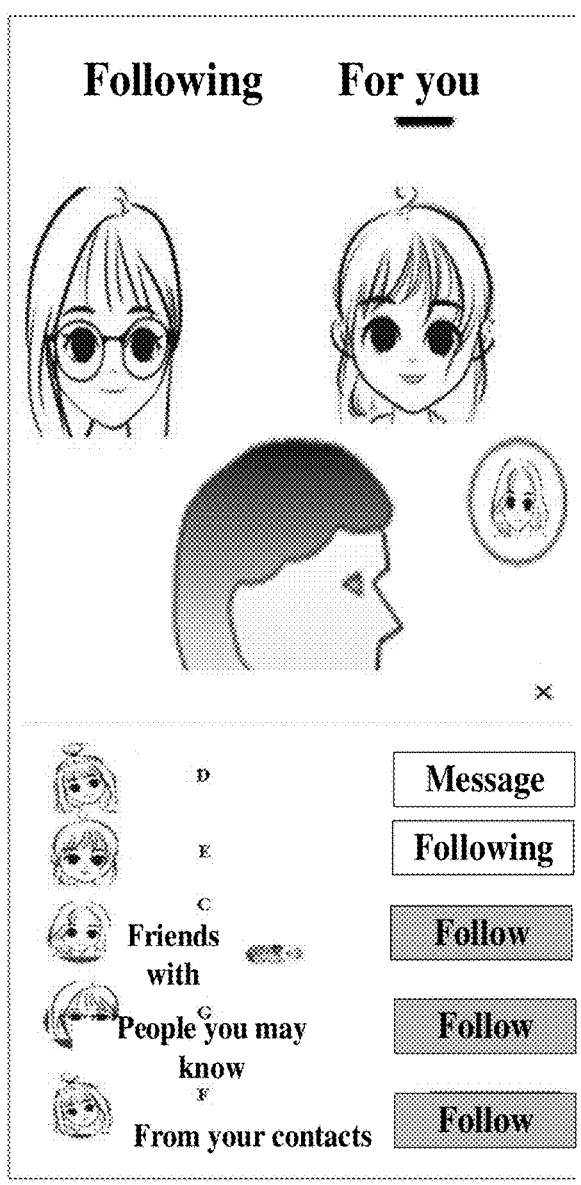

When the browser wants to see who is in the video, he can click on a hot area such as an avatar or people icon to see people in the video. The hot area can be the same for the high-interest-value and low-interest-value displays. In response to a clicking operation of the browser on the tagging result in the video, a tag list of the people in the video is displayed. For example, when the browser clicks on an avatar of a tagged people, a floating layer with a list of the tagged people is displayed. FIG. 4E and FIG. 4F illustrate the case where a single people is tagged and the case where multiple people are tagged, respectively.

As shown in FIG. 4E, the display page has thereon displayed an avatar, nickname, and username of the tagged people in the video, for example, B, and has thereon displayed his relationship with the browser, for example, "friend". A button for an operation by the browser, such as a "message" button shown in FIG. 4E, is also provided on a right side of these items of the tagged people.

As shown in FIG. 4F, the display page has thereon displayed avatars, nicknames, and usernames of multiple tagged people in the video, and has thereon displayed their relationships with the browser, such as "friend", "be a friend with the tagged people", "people you may know", "from your contacts". Buttons for operations by the browser, for example, buttons shown in FIG. 4F such as "message", "following", "follow" and the like, are also provided on a right side of these items of the tagged people.

A height of the above floating layer can be adjusted to a certain percentage of the screen, for example 50% at most, to display more tagged people.

In the floating layer, the multiple tagged users can be sorted according to their relationships with the browser, for example, the browser himself is first displayed, then friends are displayed, then matching friends are displayed, then followings are displayed, and finally strangers are displayed. Of course, the multiple tagged users can also be displayed in a tagging order.

The browser can swipe down to close the floating layer or can click on a close button to return to the news feed display.

After the video is posted, a notification and push can also be sent to a user account of the tagged people. As shown in FIG. 5A, a tagged user receives a message "AA tagged you in the video". FIG. 5A also shows that tagging time is "1 hour ago". After a corresponding operation is performed according to an indication of "swipe up for opening" shown in FIG. 5A, a page shown in FIG. 5B is entered. FIG. 5B shows details of the notification and push.

After the video is posted, an interactive page for editing the tagging result can also be provided to the first user or a second user.

Figure 6:
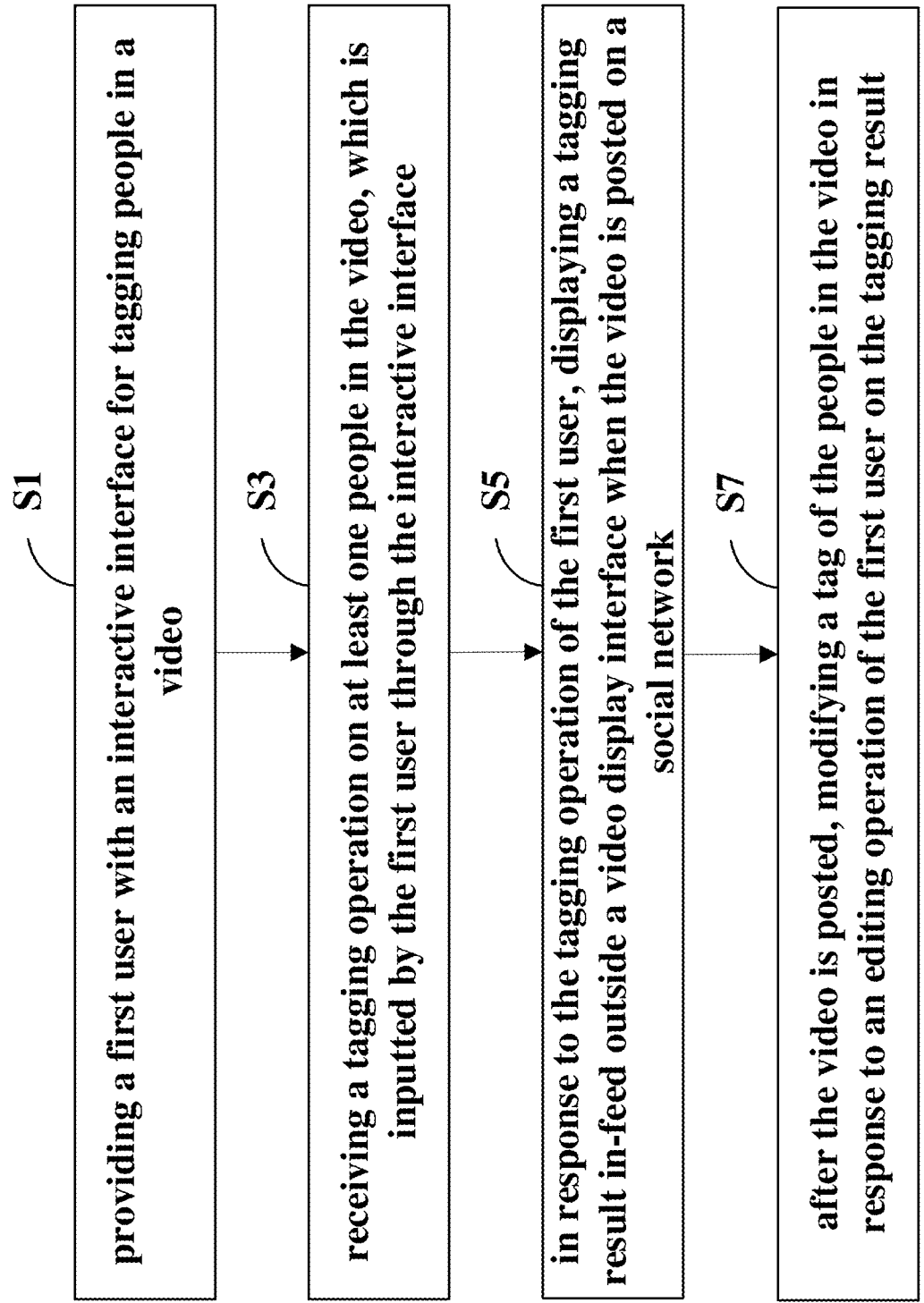
FIG. 6 illustrates a flow diagram of a video processing method according to other embodiments of the present disclosure.
Figure 6D:
FIG. 6D illustrates a sharing page according to some embodiments of the present disclosure.

Editing the tagging result by the first user after the video is posted will be described below in conjunction with FIG. 6 and FIGS. 6A to 6D. FIG. 6 illustrates a flow diagram of a video processing method according to other embodiments of the present disclosure. FIG. 6A illustrates a display page when the video creator browses a posted video according to some embodiments of the present disclosure. FIG. 6B illustrates a display page provided with an entry to "edit a tagged people" and having thereon displayed a tagged people in the video according to some embodiments of the present disclosure. FIG. 6C illustrates an "edit a tagged people" page according to some embodiments of the present disclosure. FIG. 6D illustrates a sharing page according to some embodiments of the present disclosure.

FIG. 6 differs from FIG. 1 in that step S7 is further included. Only a difference between FIG. 6 and FIG. 1 will be described below, and the same parts will not be repeated.

In step S7, after the video is posted, a tag of the people in the video is modified in response to an editing operation of the first user on the tagging result. As described above, the first user can be the video creator.

When the video creator browses the posted video, the display page as shown in FIG. 6A can be presented. The video creator can click on a non-icon position as shown in FIG. 6A and can enter the display page of the tagged people in the video, as shown in FIG. 6B. As shown in FIG. 6B, the entry to "edit a tagged people" is provided below the list of the tagged people in the video in the display page, and after clicking on it, the "edit a tagged people" page shown in FIG. 6C can be entered to perform the editing operation.

In some embodiments, the video creator can also click on a sharing button provided in FIG. 6A, i.e. an entry to "sharing floating layer", to enter the sharing page as shown in FIG. 6D. As shown in FIG. 6D, the entry to "edit a tagged people" is provided in the "sharing floating layer" and located before "privacy setting", and after it is clicked, the page of "edit a tagged people" as shown in FIG. 6C can also be entered to perform the editing operation.

After the "edit a tagged people" page is entered, the first user can edit the list of the tagged people. The modifying a tag of the people in the video can comprise at least one of: adding a tag to an untagged people in the video; or deleting a tag for the tagged people in the video.

For example, the first user can click on "x" in a top right corner of each tagged people as shown in FIG. 6C, to cancel his "tagged" state. After a "finish" button is clicked, a state after the editing can be saved and the page is closed.

In some embodiments, if the posted video is identified as "multi-people participation", i.e. there are multiple people in the video but no people has been tagged yet, the sharing button will become the "tag people" button, and after it is clicked, the sharing floating layer is opened, and the entry to "tag people" is arranged in front, for example, at the head.

Figure 7:
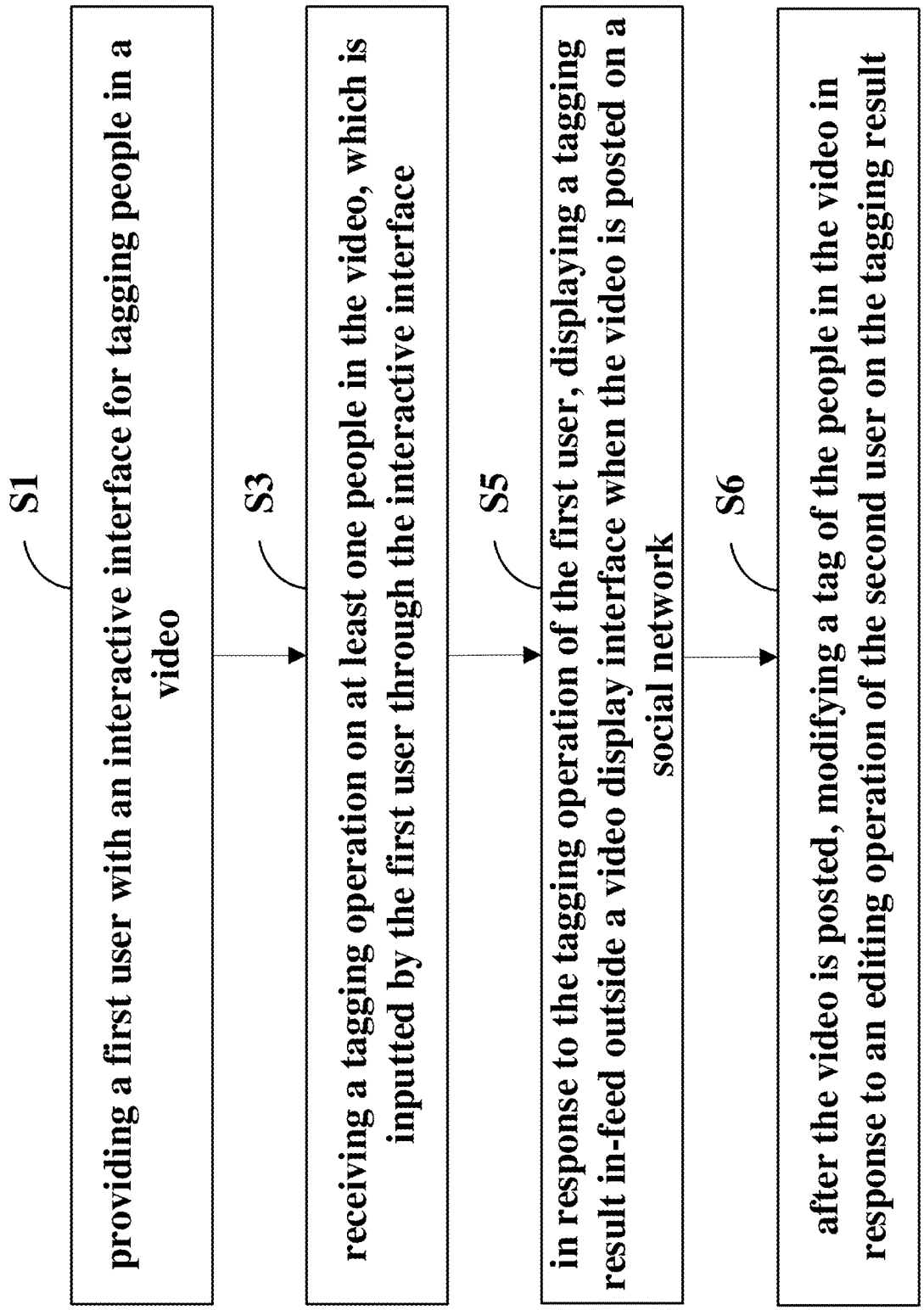
FIG. 7 illustrates a flow diagram of a video processing method according to still other embodiments of the present disclosure.
Figure 7C:
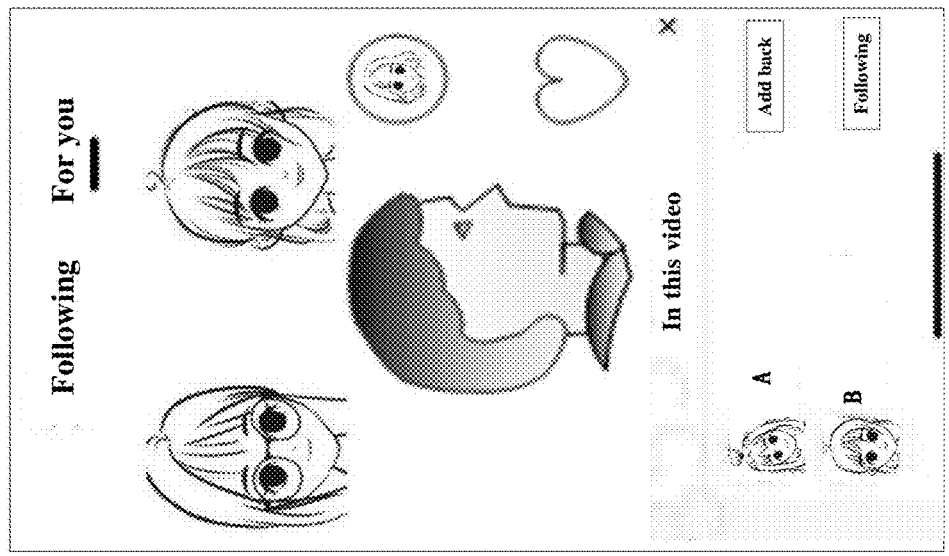
FIG. 7C illustrates an "add back a tag" page according to some embodiments of the present disclosure.
Figure 7B:
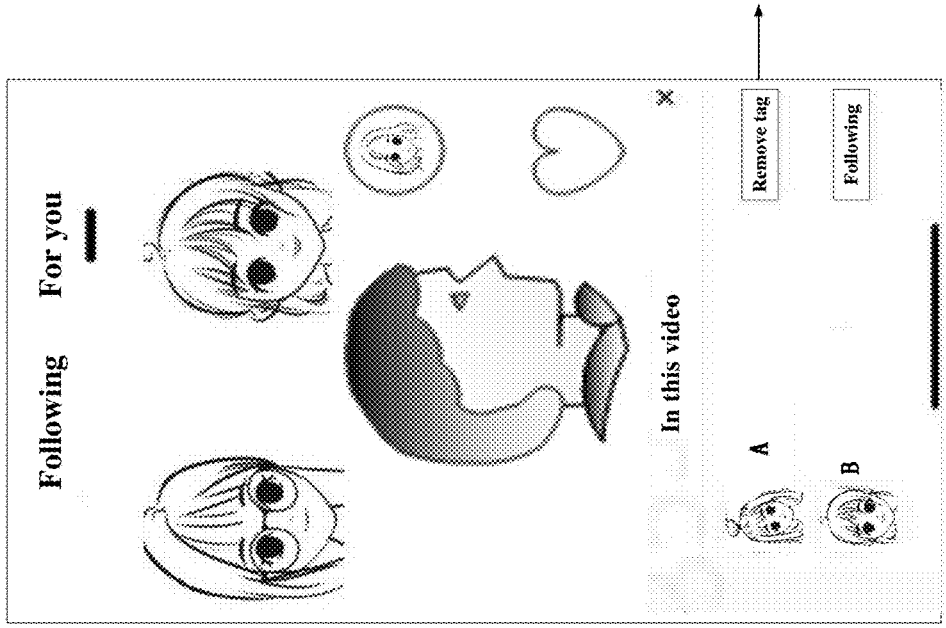
FIG. 7B illustrates a "delete a tag" page according to some embodiments of the present disclosure.
Figure 7A:
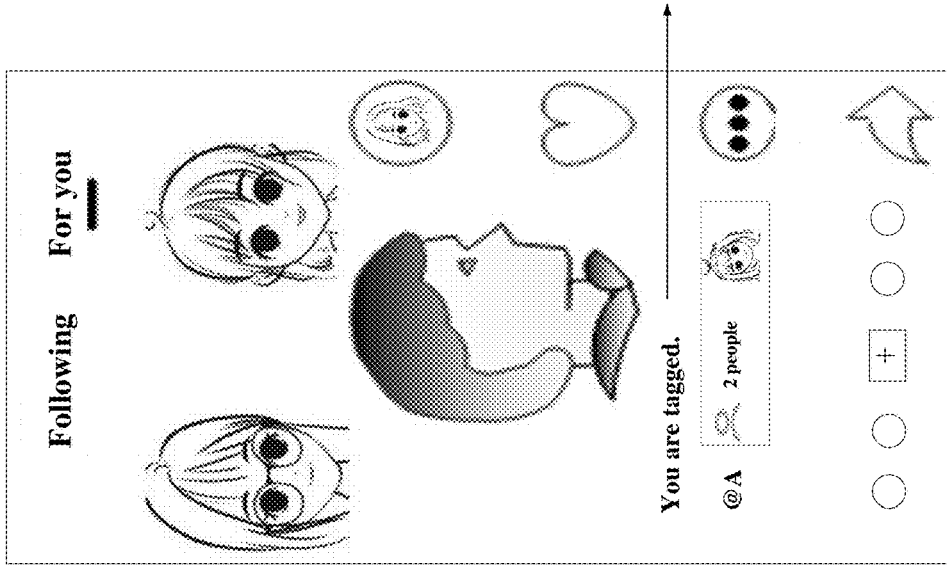
FIG. 7A illustrates a display page when a second user browses the posted video according to some embodiments of the present disclosure.
Figure 7D:
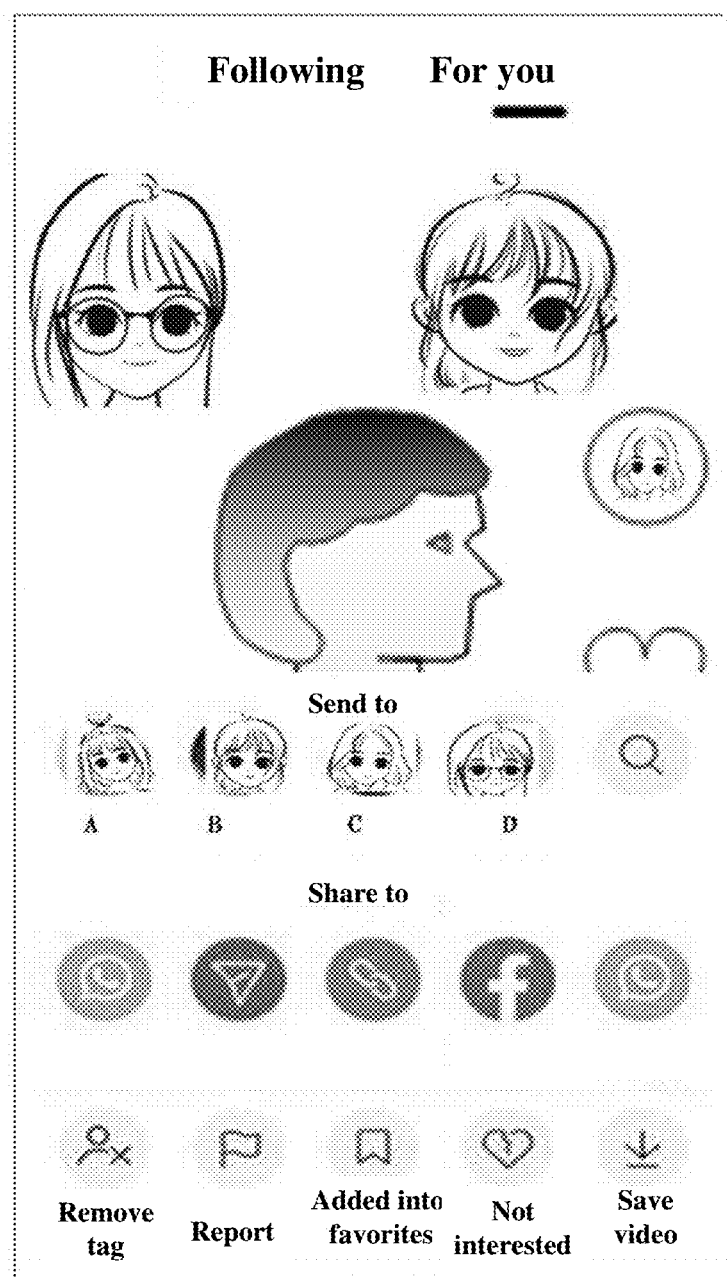
FIG. 7D illustrates a sharing page according to other embodiments of the present disclosure.

Editing the tagging result by the second user after the video is posted will be described below in conjunction with FIG. 7 and FIGS. 7A to 7D. FIG. 7 illustrates a flow diagram of a video processing method according to still other embodiments of the present disclosure. FIG. 7A illustrates a display page when the second user browses a posted video according to some embodiments of the present disclosure. FIG. 7B illustrates a "delete a tag" page according to some embodiments of the present disclosure. FIG. 7C illustrates an "add back a tag" page according to some embodiments of the present disclosure. FIG. 7D illustrates a sharing page according to other embodiments of the present disclosure.

FIG. 7 differs from FIG. 1 in that step S6 is further included. Only a difference between FIG. 7 and FIG. 1 will be described below, and same parts will not be repeated. In step S6, after the video is posted, a tag of the people in the video is modified in response to an editing operation of the second user on the tagging result.

The second user is different from the first user. The second user can be a different identity. The second user may or may not be people in the video. For the case where the second user is the people in the video, he may or may not have been tagged. Different identities correspond to different editing authorities.

For the case where the second user is one of the tagged people in the video, modifying a tag of the people in the video by the second user comprises at least one of: adding a tag to an untagged people in the video; or deleting a tag for the second user.

Unlike the first user, when the second user browses the posted video, the display page as shown in FIG. 7A is presented. FIG. 7A shows a label of "you have been tagged" and shows the number of the tagged people and partial avatars. The second user can click on a non-icon position as shown in FIG. 7A and then the "delete a tag" page as shown in FIG. 7B can be entered.

As the tagged people, the second user can see a "delete a tag" or "not tag" button provided on a right side of his own username in the list of the tagged people in the video shown in FIG. 7B, and after the button is clicked, the tag of the second user can be deleted. After the above operation, the display page will prompt "you have deleted your own tag from the video". The second user revisits the list of the tagged people and he has not been included therein.

Accordingly, the display page shown in FIG. 7B can be changed to the display page shown in FIG. 7C, and the "delete a tag" or "not tag" button can be changed to an "add back a tag" button, and after it is clicked, the tagging can be made again.

In some embodiments, the second user can also enter the sharing page as shown in FIG. 7D by using the "sharing floating layer". As shown in FIG. 7D, the "delete a tag" or "not tag" button is provided in the "sharing floating layer", and is located at the head, and after it is clicked, the display page on which the tag can be deleted as shown in FIG. 7B can also be entered.

For the case where the second user is not the tagged people in the video, the modifying a tag of the people in the video by the second user comprises: adding a tag to an untagged people in the video.

Figure 8:
FIG. 8 illustrates a display page of friending from a tagged video according to some embodiments of the present disclosure.

In addition to editing the tagging result, the second user can also friend from the tagged video, as shown in FIG. 8. FIG. 8 shows a friend matching the video creator. For example, FIG. 8 shows by whom the video creator is followed, and follow information is in a new row where the tagged people are listed, for example 3 people are tagged. The browser can click on a corresponding people to friend. FIG. 8 can only show a username by employing the low-interest-value display page, to avoid an overlap of the friending button with the avatars on the page of the tagged people.

Figure 9:
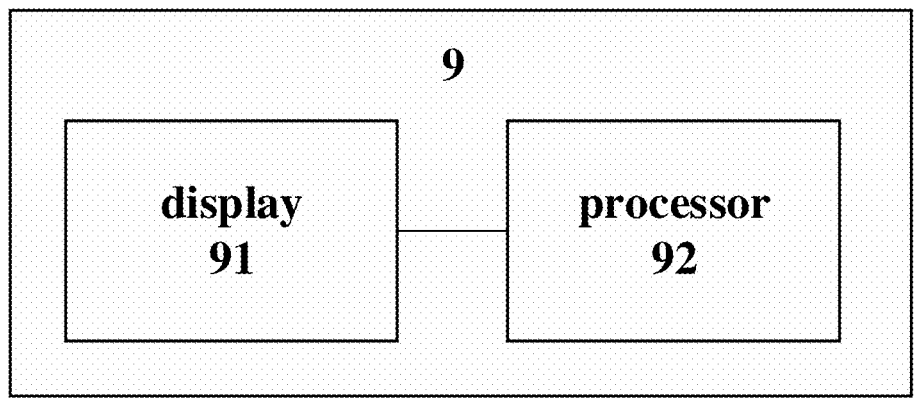
FIG. 9 illustrates a block diagram of a video processing apparatus according to some embodiments of the present disclosure.

FIG. 9 illustrates a block diagram of a video processing apparatus according to some embodiments of the present disclosure.

As shown in FIG. 9, a video processing apparatus 9 comprises: a display 91 configured to provide a first user with an interactive interface for tagging people in a video; and a processor 92 configured to receive a tagging operation on at least one people in the video, which is inputted by the first user through the interactive interface.

The display 91 is further configured to display the tagging result in-feed outside the video display interface when the video is posted on a social network in response to the tagging operation of the first user.

Furthermore, although not shown, the apparatus can also comprise a memory that can have thereon stored various information generated in an operation by units included in the video processing apparatus, programs and data for the operation, and the like. The memory can be a volatile memory and/or non-volatile memory. For example, the memory can include, but is not limited to, a random access memory (RAM), dynamic random access memory (DRAM), static random access memory (SRAM), read-only memory (ROM), flash memory. Of course, the memory can also be located outside the video processing apparatus.

Figure 10:
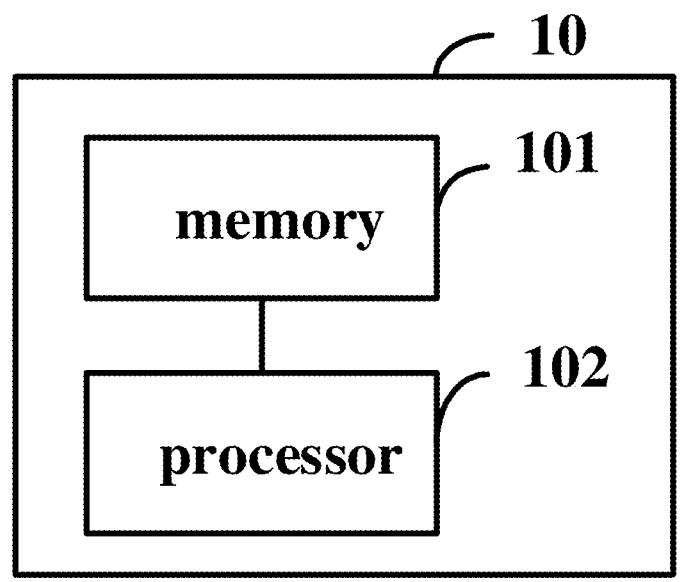
FIG. 10 illustrates a block diagram of a video processing apparatus according to other embodiments of the present disclosure.

FIG. 10 illustrates a block diagram of a video processing apparatus according to other embodiments of the present disclosure.

In some embodiments, a video processing apparatus 10 can be various types of devices, for example, they can include, but are not limited to, mobile terminals such as a mobile phone, a notebook computer, a digital broadcast receiver, a PDA (people al digital assistant), a PAD (tablet computer), a PMP (portable multimedia player), a vehicle-mounted terminal (for example, a vehicle-mounted navigation terminal), and fixed terminals such as a digital TV, a desktop computer.

As shown in FIG. 10, the video processing apparatus 10 comprises: a memory 101 and a processor 102 coupled to the memory 101. It should be noted that components of the video processing apparatus 10 shown in FIG. 10 are only exemplary and not limiting, and the video processing apparatus 10 can also have other components according to requirements for practical application. The processor 102 can control the other components in the video processing apparatus 10 to perform a desired function.

In some embodiments, the memory 101 is configured to store one or more computer-readable instructions. The processor 102 is configured to execute the computer-readable instructions which, when executed by the processor 102, implement the method according to any of the above embodiments. For a specific implementation of each step of the method and its related explanation, reference can be made to the above embodiments, which are not repeated herein.

For example, the processor 102 and the memory 101 can be in direct or indirect communication with each other. For example, the processor 102 and the memory 101 can in communication through a network. The network can comprise a wireless network, a wired network, and/or any combination of the wireless and wired networks. The processor 102 and the memory 101 can also communicate with each other through a system bus, which is not limited in the present disclosure.

For example, the processor 102 can be embodied as various suitable processors, processing devices, and the like, such as a central processing unit (CPU), graphics processing unit (GPU), network processor (NP), and the like; and can also be a digital signal processor (DSP), application specific integrated circuit (ASIC), field programmable gate array (FPGA) or other programmable logic device, discrete gate or transistor logic, discrete hardware component. The central processing unit (CPU) can be an X86 or ARM architecture, etc. For example, the memory 101 can include any combination of various forms of computer-readable storage media, for example, a volatile memory and/or non-volatile memory. The memory 101 can include, for example, a system memory having thereon stored, for example, an operating system, application, boot loader, database, another program, and the like. Various applications, various data and the like can also be stored in the storage medium.

Figure 11:
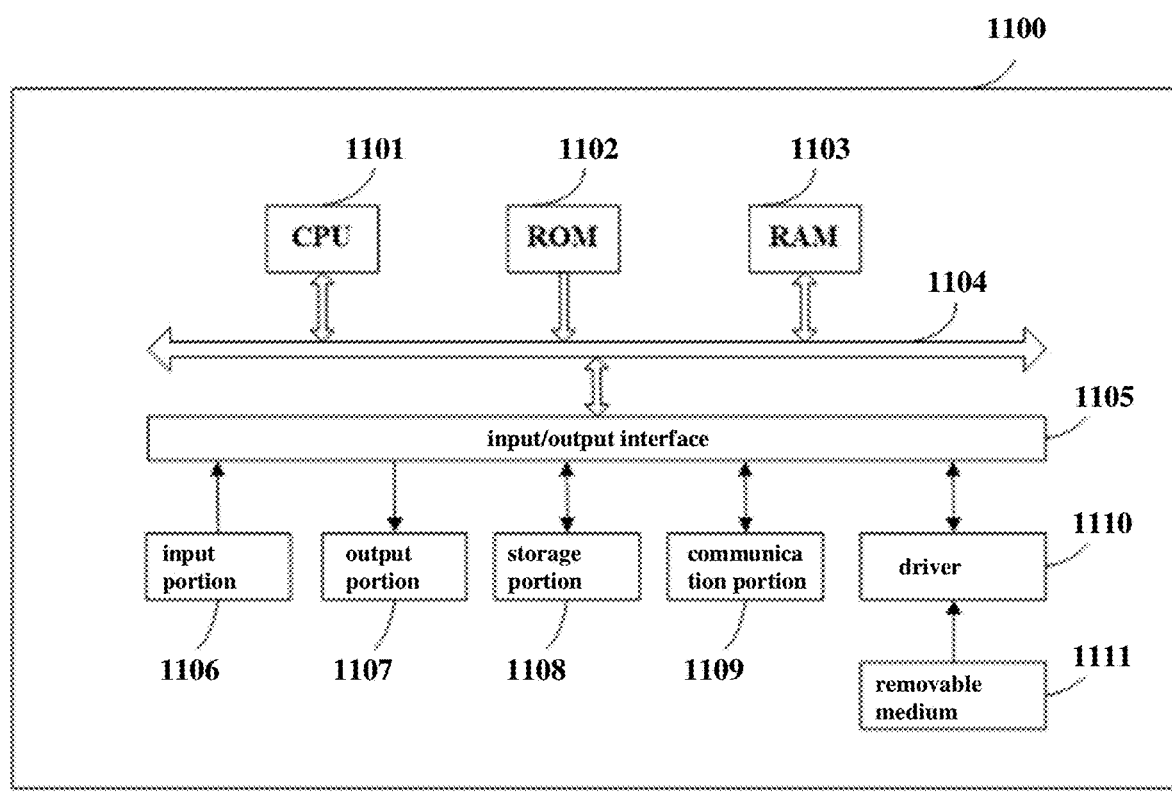
FIG. 11 illustrates a block diagram of an electronic device according to some embodiments of the present disclosure.

In addition, according to some embodiments of the present disclosure, in the case where various operations/processes according to the present disclosure are implemented by software and/or firmware, a program constituting the software can be installed from a storage medium or a network to a computer system having a dedicated hardware structure, for example, a computer system of an electronic device 1100 shown in FIG. 11, which is capable of performing various functions including functions such as those described above and the like, when the various programs are installed thereon.

In FIG. 11, a central processing unit (CPU) 1101 performs various processes according to a program stored in a read-only memory (ROM) 1102 or a program loaded from a storage portion 1108 to a random access memory (RAM) 1103. In the RAM 1103, data needed when the CPU 1101 executes the various processes and the like is also stored as needed. The central processing unit is merely exemplary and can be other types of processors, such as the various processors described above. The ROM 1102, RAM 1103, and storage portion 1108 can be various forms of computer-readable storage media, as described below. It is noted that although the ROM 1102, RAM 1103, and storage portion 1108 are shown separately in FIG. 11, one or more of them can be combined or located in a same memory or storage module, or different memories or storage modules.

The CPU 1101, ROM 1102, and RAM 1103 are connected to each other via a bus 1104. An input/output interface 1105 is also connected to the bus 1104.

The following components are connected to the input/output interface 1105: an input portion 1106 such as a touch screen, a touch pad, a keyboard, a mouse, an image sensor, a microphone, an accelerometer, a gyroscope, or the like; an output portion 1107 including a display such as a cathode ray tube (CRT), a liquid crystal display (LCD), a speaker, a vibrator, or the like; a storage portion 1108 including a hard disk, a magnetic tape, or the like; and a communication portion 1109 including a network interface card such as a LAN card, a modem, or the like. The communication portion 1109 allows performing communication processing via a network such as Internet. It will be readily appreciated that while the various devices or modules in the electronic device 1100 shown in FIG. 11 communicate through the bus 1104, they can also communicate through a network or in other ways, wherein the network can include a wireless network, a wired network, and/or any combination of the wireless and wired networks.

A driver 1110 is also connected to the input/output interface 1105 as needed. A removable medium 1111 such as a magnetic disk, an optical disk, a magneto-optical disk, a semiconductor memory, or the like is mounted on the drive 1110 as needed, so that a computer program read out therefrom is installed in the storage portion 1108 as needed.

In the case where the above series of processes is realized by software, a program constituting the software can be installed from a network such as Internet or a storage medium such as the removable medium 1111.

According to an embodiment of the present disclosure, a process described above with reference to a flow diagram can be implemented as a computer software program. For example, in an embodiment of the present disclosure, a computer program product is comprised, which comprises a computer program carried on a computer-readable medium, the computer program comprising program code for performing the method illustrated by the flow diagram. In such an embodiment, the computer program can be downloaded and installed from a network through the communication portion 1109, or installed from the storage portion 1108, or installed from the ROM 1102. The computer program, when executed by the CPU 1101, performs the above functions defined in the method of the embodiment of the present disclosure.

It should be noted that in the context of this disclosure, the computer-readable medium can be any tangible medium that can have thereon contained, or stored a program for use by or in conjunction with an instruction execution system, apparatus, or device. The computer-readable medium can be a computer-readable signal medium or a computer-readable storage medium or any combination of the two. The computer-readable storage medium can be, for example, but is not limited to: an electronic, magnetic, optical, electromagnetic, infrared, or semiconductor system, apparatus, or device, or any combination of the above. More specific examples of the computer-readable storage medium can include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In the present disclosure, the computer-readable storage medium can be any tangible medium that can have thereon contained, or stored a program for use by or in conjunction with an instruction execution system, apparatus, or device. However, in the present disclosure, the computer-readable signal medium can include a data signal propagated in baseband or as part of a carrier wave, in which computer-readable program code is carried. Such a propagated data signal can take a variety of forms, including but not limited to, an electro-magnetic signal, an optical signal, or any suitable combination of the above. The computer-readable signal medium can be any computer-readable medium other than the computer-readable storage medium, and can send, propagate, or transmit a program for use by or in conjunction with an instruction execution system, apparatus, or device. The program code embodied on the computer-readable medium can be transmitted by using any suitable medium, including but not limited to: a wire, optical cable, RF (radio frequency), etc., or any suitable combination of the above.

The above computer-readable medium can be embodied in the electronic device; or can be separate and not assembled into the electronic device.

In some embodiments, there is also provided a computer program, comprising: instructions which, when executed by a processor, cause the processor to perform the method according to any of the above embodiments. For example, the instructions can be embodied as computer program code.

In an embodiment of the present disclosure, computer program code for performing an operation of the present disclosure can be written in any combination of one or more programming languages, including but not limited to an object-oriented programming language such as Java, Smalltalk, C++, and including conventional procedural programming languages, such as the "C" programming language or similar programming languages. The program code can execute entirely on a user's computer, partly on the user's computer, as a stand-alone software package, partly on the user's computer and partly on a remote computer or entirely on the remote computer or server. In the scene that the remote computer is involved, the remote computer can be connected to the user's computer through any type of network, including a local area network (LAN) or a wide area network (WAN), or can be connected to an external computer (for example, through Internet by using an Internet service provider).

Flow diagrams and block diagrams in the drawings illustrate the architecture, functions, and operations of possible implementations of systems, methods and computer program products according to various embodiments of the present disclosure. In this regard, each block in the flow diagrams or block diagrams can represent one module, program segment, or portion of code, which comprises one or more executable instructions for implementing a specified logic function. It should also be noted that, in some alternative implementations, functions noted in blocks can occur in a different order of those noted in the drawings. For example, two blocks shown in succession can, in fact, be executed substantially in parallel, and they can sometimes be executed in a reverse order, which depends on a function involved. It will also be noted that each block of the block diagrams and/or flow diagrams, and a combination of blocks in the block diagrams and/or flow diagrams, can be implemented by a special-purpose hardware-based system that performs specified functions or operations, or a combination of special-purpose hardware and computer instructions.

A module, component or unit described in an embodiment of the present disclosure can be implemented by software or hardware. A name of the module, component, or unit does not, in some cases, constitute a limitation on the module, component, or unit itself.

The above functions herein can be performed, at least in part, by one or more hardware logic components. For example, without limitation, an exemplary hardware logic component that can be used includes: a field programmable gate array (FPGA), application specific integrated circuit (ASIC), application specific standard product (ASSP), system on chip (SOC), complex programmable logic device (CPLD), and the like.

The foregoing description is only some embodiments of the present disclosure and explanations of the applied technical principles. It should be appreciated by those skilled in the art that the disclosure scope involved in this disclosure is not limited to a technical solution formed by a specific combination of the above features, but also encompasses another technical solution formed by any combination of the above features or their equivalent features without departing from the above disclosure concepts. For example, it is a technical solution formed by replacing the above features with technical features having functions similar to the disclosed (but not limited to) in the present disclosure.

In the description provided herein, numerous specific details are set forth. However, it is understood that embodiments of this invention can be implemented without these specific details. In other cases, well-known methods, structures and techniques have not been shown in detail in order not to obscure the understanding of this description.

Furthermore, while various operations are depicted in a specific order, this should not be understood as requiring that these operations be performed in the specific order shown or in sequential order. Under certain circumstances, multitasking and parallel processing can be advantageous. Similarly, while several specific implementation details are included in the above discussion, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although some specific embodiments of the present disclosure have been described in detail by way of examples, it should be understood by those skilled in the art that the above examples are for illustration only and are not intended to limit the scope of the present disclosure. It should be appreciated by those skilled in the art that modifications can be made to the above embodiments without departing from the scope and spirit of the present disclosure. The scope of the present disclosure is defined by the attached claims.

What is claimed is:

1. A video processing method, comprising: providing a first user with an interactive interface for tagging people in a video; receiving a tagging operation on at least one people in the video, which is inputted by the first user through the interactive interface; in response to the tagging operation of the first user, displaying a tagging result in-feed outside a video display content area when the video is posted on a social network; and in response to a clicking operation of a browser on the tagging result displayed in-feed in the video, displaying a tagging list of the people in the video.

2. The video processing method according to claim 1, further comprising:
    after the video is posted, modifying a tag of people in the video in response to an editing operation of the first user on the tagging result.

3. The video processing method according to claim 1, wherein the first user is a video creator, the modifying a tag of people in the video in response to an editing operation of the first user on the tagging result comprise at least one of:
    adding a tag to an untagged people in the video; or
    deleting a tag for a tagged people in the video.

4. The video processing method according to claim 1, further comprising:
    after the video is posted, modifying a tag of people in the video in response to an editing operation of a second user on the tagging result, wherein the second user is different from the first user.

5. The video processing method according to claim 4, wherein the second user is one of tagged people in the video, the modifying a tag of people in the video in response to an editing operation of a second user on the tagging result comprises at least one of:
    adding a tag to an untagged people in the video; or
    deleting a tag for the second user.

6. The video processing method according to claim 4, wherein the second user is not a tagged people in the video, the modifying a tag of people in the video in response to an editing operation of a second user on the tagging result comprises:
    adding a tag to an untagged people in the video.

7. The video processing method according to claim 1, wherein the displaying the tagging result in-feed outside the video display content area comprises: displaying the video in a corresponding feed according to an expected interest value of the browser for the video.

8. The video processing method according to claim 7, wherein the displaying the tagging result in-feed outside the video display content area further comprises:
    determining the expected interest value of the browser for the video according to browser's relationships with the first user and the tagged people in the video; or
    determining a label of the video displayed to the browser according to the browser's relationships with the first user and the tagged people in the video.

9. The video processing method according to claim 8, wherein:
    in the case where the browser is one of the tagged people in the video, determining the label as a first label;
    in the case where the browser is not one of the tagged people in the video but is in association with the first user and the tagged people in the video, determining the label as a second label;

in the case where the browser is not one of the tagged people in the video, is not in association with the first user, but is in association with the tagged people in the video, determining the label as a third label; and in the case where the browser is neither one of the tagged people in the video nor in association with the first user and the tagged people in the video, determining the label as a fourth label.

10. The video processing method according to claim 8, wherein the displaying the video in a corresponding feed according to an expected interest value of the browser for the video comprises: in the case where the expected interest value of the browser for the video is greater than or equal to a threshold, displaying an avatar of the at least one tagged people in the video; and in the case where the expected interest value of the browser for the video is less than the threshold, displaying a username of the at least one tagged people in the video.

11. The video processing method according to claim 8, wherein the displaying the tagging result in-feed outside the video display content area further comprises:

adjusting the expected interest value of the browser for the video, which is determined according to the relationships, according to a duration of browsing the video by the browser.

12. The video processing method according to claim 1, wherein the providing an interactive interface for tagging people in a video comprises at least one of:

providing a search interface;

providing a recommended tag list; or displaying a list of the tagged people in the video.

13. A video processing method according to claim 1, comprising:

providing a first user with an interactive interface for tagging people in a video;

receiving a tagging operation on at least one people in the video, which is inputted by the first user through the interactive interface;

in response to the tagging operation of the first user, displaying a tagging result in-feed outside a video display interface when the video is posted on a social network; and in a case where a number of the tagged people is M, displaying, on a video posting page, avatars of N tagged people and a difference X between the number of the tagged people and a number of displayed avatars, where M is a positive integer greater than 1, N is a positive integer greater than 1, M is greater than N, and X=M−N.

14. A video processing apparatus, comprising: a display configured to provide a first user with an interactive interface for tagging people in a video; a processor configured to receive a tagging operation on at least one people in the video, which is inputted by the first user through the interactive interface, wherein the display is further configured to display, in response to the tagging operation of the first user, a tagging result in-feed outside a video display content area when the video is posted on a social network, and display, in response to a clicking operation of a browser on the tagging result displayed in-feed in the video, a tagging list of the people in the video.

15. A video processing apparatus, comprising:

a memory; and a processor coupled to the memory, the processor being configured to perform, based on instructions stored in the memory, one or more steps in the video processing method according to claim 1.

16. A non-transitory computer-readable storage medium having thereon stored a computer program which, when executed by a processor, performs the video processing method according to claim 1.

17. A video processing apparatus, comprising:

a memory; and a processor coupled to the memory, the processor being configured to perform, based on instructions stored in the memory, one or more steps in the video processing method according to claim 13.

18. A non-transitory computer-readable storage medium having thereon stored a computer program which, when executed by a processor, performs the video processing method according to claim 13.

* * * * *